United States Patent
Fox

(10) Patent No.: US 10,848,581 B2
(45) Date of Patent: *Nov. 24, 2020

(54) SECURE COMMUNICATIONS SYSTEM AND METHOD

(71) Applicant: VIRTUAL WORLD COMPUTING, LLC, Santa Barbara, CA (US)

(72) Inventor: Brian J. Fox, Santa Barbara, CA (US)

(73) Assignee: VIRTUAL WORLD COMPUTING, LLC, Santa Barbara, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 15/499,007

(22) Filed: Apr. 27, 2017

(65) Prior Publication Data

US 2018/0077256 A1    Mar. 15, 2018

Related U.S. Application Data

(60) Division of application No. 12/846,793, filed on Jul. 29, 2010, now Pat. No. 9,674,295, which is a
(Continued)

(51) Int. Cl.
*G06Q 30/00* (2012.01)
*H04L 29/08* (2006.01)
(Continued)

(52) U.S. Cl.
CPC ..... *H04L 67/2828* (2013.01); *G06Q 30/0613* (2013.01); *H04L 69/14* (2013.01);
(Continued)

(58) Field of Classification Search
CPC . H04L 67/2828; H04L 69/14; H04L 63/0281; H04L 69/04; H04L 65/104;
(Continued)

(56) References Cited

U.S. PATENT DOCUMENTS

| 6,023,684 | A | * | 2/2000 | Pearson | G06Q 20/00 705/36 R |
| 2002/0133467 | A1 | * | 9/2002 | Hobson | G06Q 20/02 705/64 |

OTHER PUBLICATIONS

B. Leiba, "OAuth Web Authorization Protocol," in IEEE Internet Computing, vol. 16, No. 1, pp. 74-77, Jan.-Feb. 2012. (Year: 2012).*

* cited by examiner

*Primary Examiner* — Anand R Loharikar
(74) *Attorney, Agent, or Firm* — Lathrop GPM LLP

(57) ABSTRACT

A system and method providing a collection of associated servers in a data center connected to the Internet. The servers, each being related to a service, deliver a client to a user, encapsulating the related services to common standard Internet browser software. The system and method provide a window to the Internet. The associated servers perform browsing for a user, stripping out viruses and malware and delivering safe content. The content enables a user to view and interact with the content on its computer, but not processing that content on the user's computer; the content is not stored on any local storage at the user's computer. The system and method for the delivery of services is tightly integrated into the Internet browsing experience and provides the end-user with anonymity, privacy, fraud protection, and multiple-client sharing of meta-information pertaining to the browsing experience.

16 Claims, 22 Drawing Sheets

Related U.S. Application Data continuation of application No. 12/783,456, filed on May 19, 2010, now Pat. No. 9,131,007.

(60) Provisional application No. 61/229,465, filed on Jul. 29, 2009, provisional application No. 61/179,648, filed on May 19, 2009.

(51) Int. Cl.
*G06Q 30/06* (2012.01)
*H04L 29/06* (2006.01)
*H04N 19/61* (2014.01)
*H04N 19/40* (2014.01)
*H04N 19/164* (2014.01)

(52) U.S. Cl.
CPC ........ *H04L 63/0281* (2013.01); *H04L 65/104* (2013.01); *H04L 69/04* (2013.01); *H04N 19/164* (2014.11); *H04N 19/40* (2014.11); *H04N 19/61* (2014.11)

(58) Field of Classification Search
CPC .... G06Q 30/0613; H04N 19/61; H04N 19/40; H04N 19/164
USPC ................................ 705/26.1–27.2
See application file for complete search history.

IP Address and Privacy Protection

| Identifying Information | Without Cocoon - your information | With Cocoon - our Information |
|---|---|---|
| Your IP address | 75.69.250.243 | 98.171.177.74 |
| Your IP address country | United States | United States |
| Your IP address state | Massachusetts | California |
| Your IP address city | Gloucester | Santa Barbara |
| Your IP address postcode | 01930 | 93111 |
| Your IP address latitude | 42.5179 | 34.0184 |
| Your IP address longitude | -70.7154 | -119.7572 |
| Your ISP | Comcast Cable | Time Warner |
| Host of your IP | c-75.69.250.243.hsd1.ma.comcast.net | ip98-171-177-74.sb.sd.cox.net |
| Your Local Date/Time | 12/29/2009 12:31 | 12/29/2009 09:31 |
| Your Speed | Cable/DSL | 1GB |
| Your Browser | Mozilla Firefox 3.0 | Firefox (IE Compatible) |
| Your Operating System | WinXP | Linux |
| Your Language | en-us,en;q=0.5 | en-us,en;q=0.5 |
| Your Javascript Version | 1.8 | 1.8 |
| Your Plugin Support | Java, Flash Player, SVG, PDF, QuickTime, Real Player, WMA/WMV | Java, Flash Player, SVG, PDF, QuickTime, Real Player, WMA/WMV |
| Your Referrer (the site you came from) | http://www.google.com with searchstring "ip address locator" | http://www.google.com with searchstring "ip address locator" |

FIGURE 13

Web Page Title http://www.barnesandnoble.com

Loaded profile: kponto → 10

Search [kponto]

Enter a Shipping Address

First Name

Last Name

Address 1

Address 2

City

State

Zip

Enter Your Email Address

} 9

SUBMIT

FIGURE 14

Web Page Title http://www.barnesandnoble.com    Search

Loading profile: kponto    kponto

Home  ← 11
Work
--------
Clear Form
Save Form as New

Enter a Shipping Address

First Name: Kevin
Last Name: Ponto
Address 1: 400 W Pedregosa
Address 2: Apt. A
City: Santa Barbara
State: CA
Zip: 93103

⎫ 12
⎬
⎭

Enter Your Email Address: kevin@gmail.com  ← 13

SECURE COMMUNICATIONS SYSTEM AND METHOD

REFERENCE TO RELATED APPLICATIONS

This application is a divisional of U.S. patent application Ser. No. 12/846,793 filed Jul. 29, 2010, which claims the benefit of priority to U.S. Provisional Application No. 61/229,465, filed Jul. 29, 2009 and is a continuation of U.S. patent application Ser. No. 12/783,456 filed May 19, 2010, which issued as U.S. Pat. No. 9,131,007 on Sep. 8, 2015. U.S. patent application Ser. No. 12/783,456 claims the benefit of priority to U.S. Provisional Application No. 61/179,648 filed May 19, 2009. Each of the above-referenced applications is herein incorporated by reference in its entirety.

BACKGROUND

Parallel development of inexpensive computers and the Internet has enabled computer users to easily communicate among themselves and conduct transactions from various geographic locations. These developments have not come without costs.

By way of example, users must often deal with virus-laden computers, never-ending reams of spam, and credit card bills for purchases they did not make. New threats emerge daily and PC-based security and privacy software cannot keep up. Crooks and hackers worldwide continually find ways around typical PC protection and find new ways to compromise online security and privacy. Internet users typically have been victims of online attacks, or will be a victim at some time. The financial cost of managing these problems on an individual basis is considerable, but the cost is overwhelmed by the loss of personal time required to address cleanup after-the-fact.

Prior art systems for Internet users either provide direct access to the Internet or have some mechanism that attempts to create a more secure interface. Systems that provide direct access between client and Internet give rise to the above-noted problems and generally lead to a loss of security. Moreover, these problems also lead to threats of identity theft that is of increasing concern to Internet users. Systems that attempt to create a more secure interface, either directly or indirectly, typically suffer from slower processing time, degradation of quality of content, and general degradation of the deliverable. With the increase in cybercrime and cyber-nuisance, including phishing, spamming, identity theft, and credit card theft, combined with increasing complexity and size of data transported across the Internet, the existing systems fall woefully and dangerously short.

New browsers, so-called "proxy browsers", such as Google and SafeCentral, merely create localized privacy, and neither provide anonymous website access nor provide a solution to financial and spam concerns. In the case of SafeCentral, it includes a list of pre-cleared websites that can be accessed, but it does not create a secure interface with those websites.

Other attempts at proxy browser websites do not address financial or spam concerns, and still permit third party content to be loaded onto the user's computer. In addition, content delivery of complex media, such as video or multi-media webpages, is slow and cumbersome. These sites often rely on third party content players, such as RealPlayer, which introduces another potential for risk instead of eliminating potential risk sources.

Other attempts to address the security and speed combination are through the use of anonymous networks. However, these networks essentially rely on the user's neighbor's connectivity and opaqueness. Most importantly, these solutions still bring website content onto the user's computer.

A range of off-the-shelf Internet security software packages are available to consumers, such as Norton, Spam-Fighter, McAfee products, and Mightykey. However, most users even today have difficulty not only navigating through the host of mediocre choices, but also navigating through the user manual and the first few months of getting used to using the new software. Furthermore, these software products typically only address static filtering of information coming from websites, and do not protect users from identity theft and other fraud that may occur when conducting purchasing or similar transactions on the Internet.

In addition, existing systems for secure access to the Internet process multiple, simultaneous requests sent through a browser linearly, i.e., processing each information packet as it arrives without regard for the information type, client priority, or any other type of prioritization criteria. This results in slow, frustrating processing times which induce user's to bypass the systems and defeat the purpose of having such software in place.

In a prior art system, as shown in FIG. 1, services are offered to provide web proxy servers, e-mail/online-identification services, a service for storing and recalling user input to forms on associated websites, and services providing fraud protection for purchases on the Internet. However, the utility of such systems is greatly limited by the diversity of the interfaces and system implementations.

Web proxy servers, such as Squid, exist as a buffer between browsers that are installed on a user's computer, and the Internet that the user searches. These proxy servers can cache incoming content, reuse content requested by one client for delivery to another client, and present a single IP address to Internet servers that they communicate with, effectively hiding the source IP address.

Such a proxy system is manually configured for use in each browser, on each machine, and in each location (e.g., home or office). Such proxy configurations are a function of the system administration of the network that the client is attached to and client configuration of the specific client. Thus, the proxying service does not belong to the end-user, and thus cannot be utilized wherever the end-user needs it (e.g., browsing kiosk, Internet Cafe, etc.).

Public access e-mail systems exist that allow end-users to create a new address that is not clearly associated with other information about themselves. For example, the Yahoo! mail is a free system provided by Yahoo!, yet the process requires end-users to create the e-mail address by choosing an address that has not been chosen before, create a password for accessing the e-mail, and then configure the individual mail clients on her various systems to read e-mail sent to that address. Other systems have addressed the difficulty of creating many addresses by allowing the end-user to create an address matching a specific template, and then subsequently receive new e-mails at that address.

For example, Google Gmail™ system attempts to "pre-filter" a user's mail such that the user can successfully hide their "real" e-mail address from entities that require a one-way notification address. Because the addresses on the Google system are built in template fashion, the original e-mail address can easily be derived, and the goal of anonymity is lost. More specifically, the Google Gmail™ system allows users to create ad-hoc addresses, but those addresses do not provide anonymity. For example, users may simply add a plus sign (+) and other characters to the end of their existing e-mail account name in order to receive e-mails at this new address. Thus, the e-mail address account harrysmith@gmail.com will receive e-mails for harrysmith+macys@gmail.com, harrysmith+sears@gmail.com, and harrysmith+sierra@gmail.com. Obviously, the original e-mail account is trivial to derive from these ad hoc addresses.

Existing web browsers may include a system and method of remembering the values that an end-user has inputted on various forms at different sites on the Internet, as shown in FIG. 2. This form-filling function adds a valued convenience to the end-user while entering information on a website. The data utilized for form-filling belongs to a specific instance of the web browser. Thus, the values that the end-user has filled out on her Internet Explorer™ browser at home, is not available for reuse on her Safari™ browser at work.

Debit card fraud protection for online transactions exists in differing forms today. The existing solutions rely on the card issuer to generate new one-time numbers ("OTN") (for example, VISA™ ShopSafe), or the user to generate OTNs (see, for example, U.S. Pat. No. 6,908,030). The systems are disconnected from the process of goods and/or service selection, and require users to stop shopping in order to perform a payment process. Other solutions rely on the merchant to have special knowledge of the process (for example, PayPal™), and thus can only be used at a limited number of merchants (i.e., those that have signed up with the issuer's process).

Web Proxy servers do not prevent raw content from arriving at the client system. The client system is responsible for virus protection and for fine-grained content filtering. In addition, existing browser systems employ a plug-in model, which relies upon third-party software to execute and/or visualize the content fetched from the Internet. Such plug-ins may contain bugs, or be vulnerable to virus attacks, and are not under the control of the invoking browser system. Thus, the user's browser is simply a conduit between Internet content and third-party software. Because the browser is not a firewall (by definition), it allows Internet content to be directly executed on the end-user's computer.

Form-filling is the term used to describe the automated suggestion or full-in technique employed by existing browsers when the end-user is presented with a form. But, as was pointed out earlier, the information about those forms is specific to the instance of the browser that is running. If a user fills out a form on her home machine, the values she entered are not available for use on her office machine, or at the airport Internet kiosk. The same is true of any "cookies" that she has stored while browsing, her browsing history, and her bookmarks and annotation for websites she has visited.

Debit card transactions on the Internet are an important part of e-commerce. However, current systems are fraught with fraud, causing large losses to the credit card industry, and major inconvenience to the end-user. Existing systems that attempt to lower the possibility of fraud are inconvenient for end-users, who are generally motivated only by convenience, because their fraudulent transactions are paid for by the defrauded merchants. Such systems have difficulty gaining traction.

Thus, there remains a need for a system that provides a secure Internet connection for a user, both outgoing (user-to-Internet), and incoming (Internet-to-user).

SUMMARY

The system and method of the invention, in one form, provides a collection of associated servers in a data center connected to the Internet. The servers, each being related to a service, deliver a client to a user, encapsulating the related services to common standard Internet browser software. In effect, the system and method of the invention provide a window to the Internet. The associated servers perform browsing for a user, stripping out viruses and malware and delivering safe content. The content is truly safe, providing a user to view and interact with the content on its computer, but not processing that content on the user's computer; the content is not stored on any local storage at the user's computer. In various embodiments, the system and method provide, for example, virus protection by blocking viruses before they reach the user's computer, privacy protection by not exposing a user computer's IP address while online, spam protection by providing a user computer a onetime and/or per-purpose e-mail addresses (preventing spammers from having access to the real e-mail address for a user) and online financial protection through a protected debit card which never exposes a user's personal banking information to a merchant or other third party coupled to the Internet. Further, the method and system of the invention provide a hosted service so that, in effect, a user's "browser" becomes portable, making the user's bookmarks, homepage and browser settings available for the user at any computer, while privacy and security remains protected. In view of the prophylactic effect, isolating a user from access and identification by third parties coupled to the Internet, the system and method of the invention are referred to below as a Cocoon™ system and Cocoon™ method, respectively.

In an embodiment, the delivered client and associated services, provide identity protection, fraud protection, and computer virus protection to the user of the client. The client appears to the user to be commonplace Internet browser software. The services delivered in the encapsulation of the client can be automatic, or may optionally be controlled by the user. In an embodiment, the services offered include, but are not limited to, a web proxy server, an anonymous dynamic e-mail/online-identification service, a service for storing and recalling user input to forms on associated websites, a notification service, and a service providing fraud protection for purchases over the Internet.

The present system, in effect, presents a browser to a user, which does not require application-specific software on the user's computer. Existing Internet browsing systems are not delivered to the user as a service over a network, but instead must be installed on the user's computer.

In one form, the present system and method stores meta-data about the browsing experience of a user, including browser settings, in a network. In contrast, prior art systems and methods of browsing store meta-data locally, i.e. at the user's computer, where the data is not readily available to other machines to which the user has access.

The system and method of the invention provide a mechanism of tightly integrating various network services into the browsing experience of the user. In contrast, prior art systems and methods of browsing are stand-alone applications—there is no server side component, so there are no collections of integrated multiple seemingly diverse network services delivered in the prior art.

The system and method of the invention provide basic privacy and protection within a user's browsing experience pursuant to (1) a proxy service which protects the users IP address and browser information from websites visited, (2) decoding of incoming rich data from content providers coupled to the Internet, and transcoding of that received data into safe standard media types and (3) dynamically delivering client software to a user's computer which stores nothing on the user's computer and which is capable of displaying the standard media representing the received-by-proxy browser content. The delivered (to the user's computer) client is device and platform independent. In a preferred form, the client is not installed on the user's computer but is dynamically loaded into memory of his/her computer when the user logs on to the service provided by the system of the invention. Associated servers of that system operate preferably with within a data center. The associated servers are a set of hardware computing elements connected via standard applications programming interfaces (APIs) and protocols. When a user logs on to the service provided by the system and requests access to websites, a server of the system does the work of contacting the websites and rendering the resultant information to be displayed on the user's computer. The information is then encoded into display blocks, and sent to the client. The client on the user's computer displays the display blocks, and provides an interactive experience for the end user. All execution of code for displaying pages and carrying out of user actions is done on the server of the system, providing arm's length access to full Web content.

The present invention involves a system and method for the delivery of services tightly integrated into the Internet browsing experience. The system S provides the end-user with anonymity, privacy, fraud protection, and multiple-client sharing of meta-information pertaining to the browsing experience. This directly translates to more convenience for the user.

DESCRIPTION OF THE DRAWINGS

FIG. 13 is a table comparing IP address and privacy between the present invention and the prior art.

FIGS. 14-18 show exemplary web screens relating to form management and notifications with the present invention.

FIGS. 19-22 show exemplary web screens relating to debit card transactions with the present invention.

DETAILED DESCRIPTION

Figure 1:
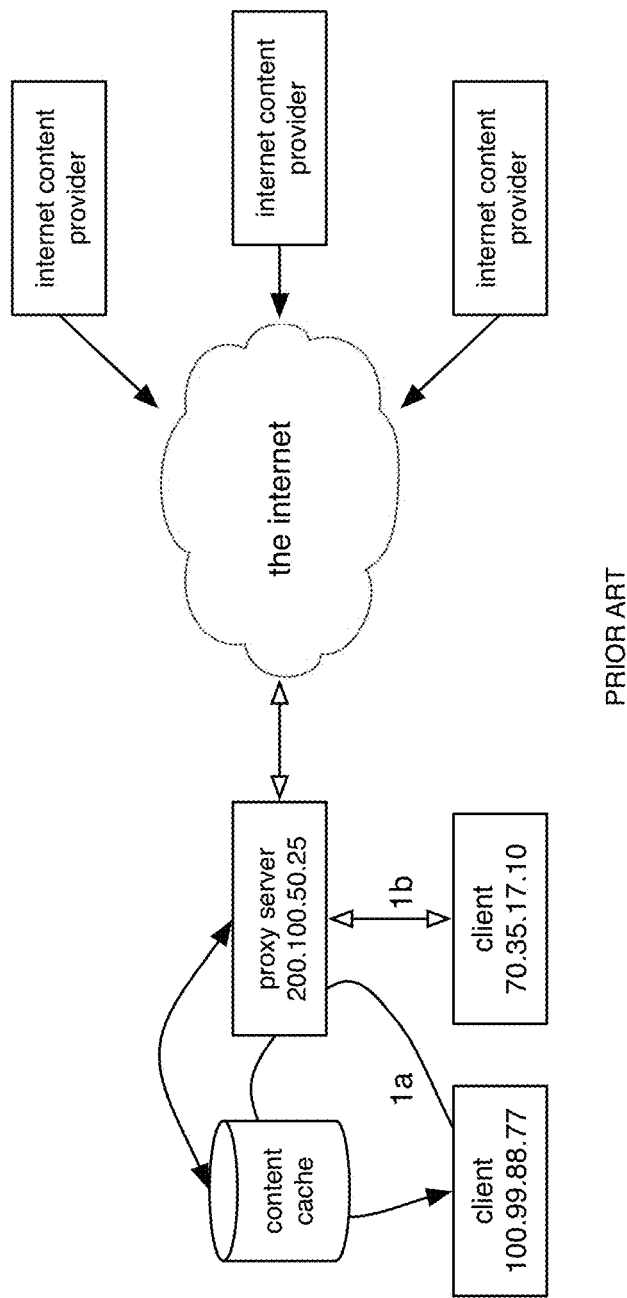
FIG. 1 shows a web proxy server configuration of a prior art system.
Figure 2:
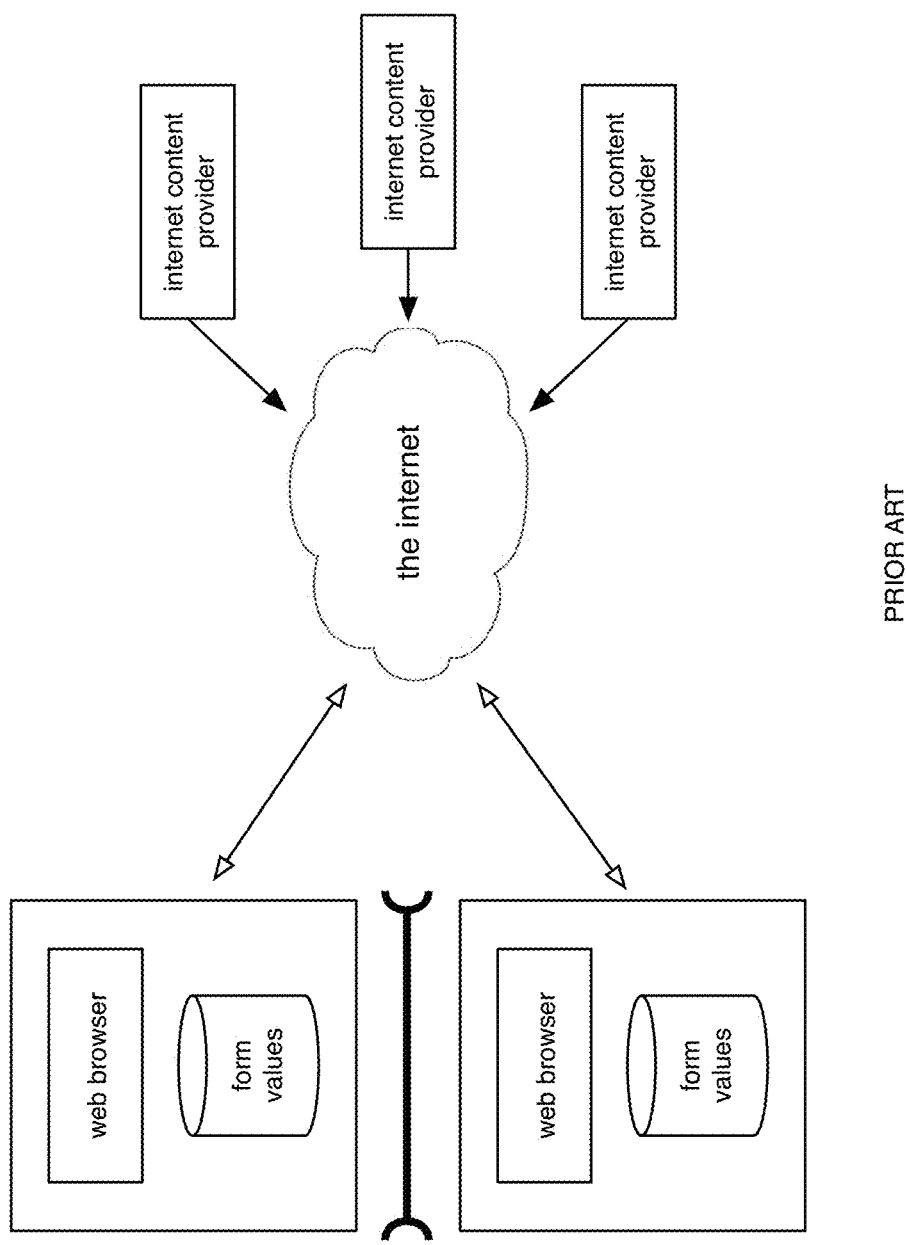
FIG. 2 shows a non-network system for storage of form data of a prior art system.
Figure 3:
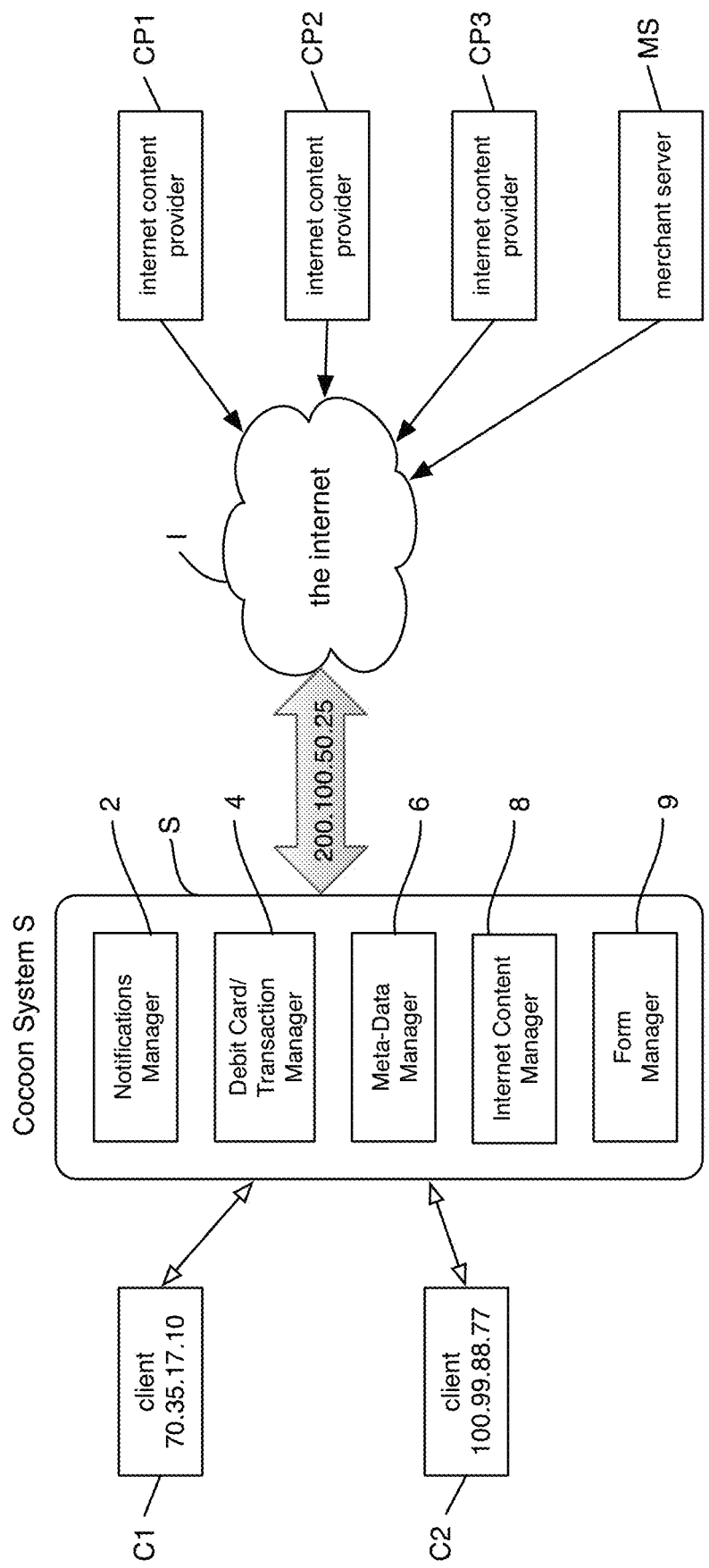
FIG. 3 is a block diagram of an exemplary embodiment of the present system.

An embodiment of the invention is depicted in block diagram form in FIG. 3, showing multiple clients (C1, C2) coupled to a Cocoon system (S), in turn connected to the Internet (I). The clients each have an associated IP address as illustrated in FIG. 3. Three content providers (CP1, CP2, CP3) are also connected to the Internet. A fourth content provider (MS) functions as a merchant server, as described more fully below. The system (S) provides multiple services, as well as providing a proxy service to the Internet. These services are provided by a collection of associated servers in a data center. In the illustrated example of FIG. 3, five servers are present, Notifications Manager 2, Debit Card Manager 4, Meta-Data Manager 6, Internet Content Manager 8, and Form Manager 9.

While illustrated in a single block in FIG. 3, various elements of the system S may be at a single physical location (in one or more computers), or distributed over a number of physical locations. Preferably, each of the servers is related to a distinct service, and delivers a client to a user, encapsulating the related services to common standard Internet browser software. As used herein, the term "client" refers to an application or system that accesses any remote service on another computer system known as a server, by way of a network. (Sadoski, Darleen. Client/Server Software Architectures—An Overview, Software Technology Roadmap, 1997, Aug. 2). As used herein, the term "user" refers to a computer, or computer-like appliance, which is comparable by a human, to send and receive communications over the Internet.

The system S, and its associated method, are not application software. Rather, the system S, and its associated method, establish a web-based service that to a user, looks and feels like a native application running on his/her computer. The software defining the system and method is not installed on the user's computer, but rather resides within a set of servers, preferably at a data center. As a consequence, a user may access the method and system on any computer or computer-appliance connected to the Internet. Typically, a client is downloaded to a user's computer to enable operation pursuant to the method of the invention. In use, a user first connects to a website associated with the system S and logs in, before visiting any other sites on the Internet. The system S provides the client to the user on his computer, in the form of a dynamically loaded "browser", a secure and private launching point for further online activity. The loaded "browser", i.e., the client, is loaded to memory in the user's computer (as opposed to being installed on a computer) and presents a near-normal looking browser home page. The user can interact with that browser page as he/she would be if there was a browser installed and running on his computer. The loaded "browser" communicates with one or more servers of the system S, which in turn performs the desired operations indicated by the user's input to the "browser" screen on his/her computer, and displays the resulting content to the user "browser" screen of the user's computer. When the user logs off by way of the loaded "browser", nothing is left behind on the user's computer.

The system S includes a proxy browser server and function which does not require application-specific software on a user's computer. Prior art Internet browsing systems are not delivered to a user as a service, but rather a browser is downloaded to, installed on, and run on a user's computer.

Pursuant to the proxy server aspect of the system S, in operation, a client's IP address is not revealed to Internet content providers because the Internet content manager server 8 of system S performs the actual interactions with the various Internet content providers, including requesting and fetching information, and scrubbing/processing communications from content servers to remove undesired content, such as malware. The system S also provides a method for the storage of meta-data associated with by-proxy browsing sessions, as well as browser settings, for a client. The system S additionally provides various services related to Internet browsing, such as a protected method for providing payment to non-participating Internet merchants (connected to the Internet via merchant server content providers), by which the merchant cannot utilize the payment information without the explicit permission of the user. An exemplary merchant server content provider is illustrated by block MS in FIG. 3. All of these system functions/servers are tightly integrated, providing highly efficient browsing experiences for users.

Safe Browser

Figure 4:
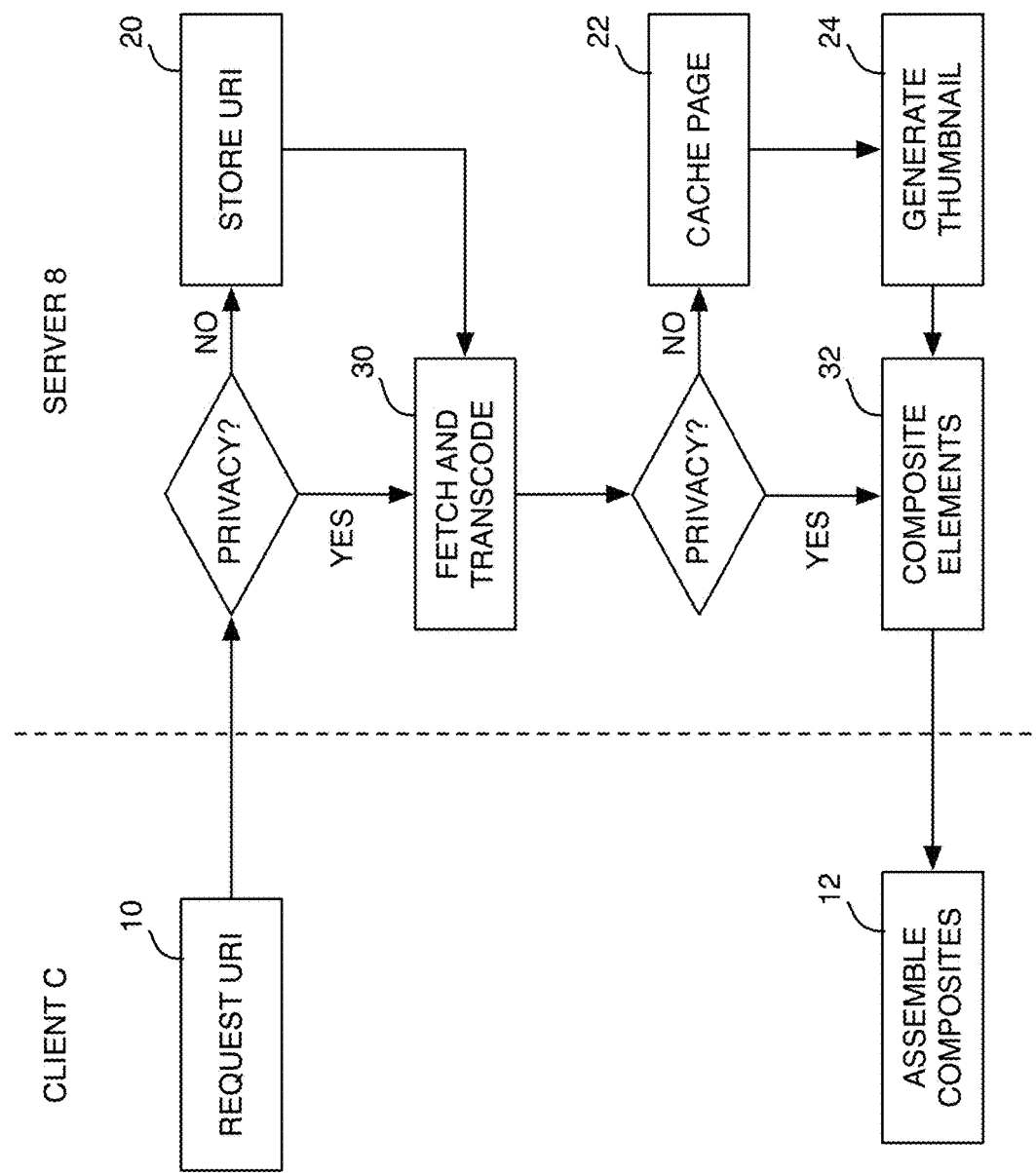
FIG. 4 is a flowchart of an exemplary embodiment of the Dynamic Client/Server Internet Browser System of the present system.

The operation of an exemplary embodiment of system S and its associated method, is illustrated for client/server browsing on the Internet, is presented in flowchart form in FIG. 4.

As illustrated in FIG. 4, a client resident on a user computer, initially makes a request (10) of the Internet Content Manager server 8 to view Internet content using a Uniform Resource Identifier (URI). The user, through the client resident on his computer, can specify that the request is associated with a privacy option or not. At the server 8, if the user has not specified a privacy option, the URI associated with requests (10), is stored (20). Whether or not the privacy option is specified, server 8 fetches or retrieves (30) the requested content from the content provider. The individual components that make up the content (i.e., text, images, video, audio, markup language, etc.) are transcoded (30) into system canonical forms. If the user has not specified a privacy option, the elements comprising the content are cached on the server (22), and a thumbnail image representing the content is generated and stored on the server as well (24). Whether a privacy option has been specified or not, the transcoded elements comprising the content are (directly, if privacy option is specified, or indirectly after being cached) arranged and ordered for user viewing, and are then returned to the client along with instructions for assembly (32). The client assembles the composite element information and presents the results to the user (12). The client has no direct access to, or processing of (other than assembly), content received from the Internet; all such direct access and processing is performed by the server at system S. As a consequence, there is no exposure of the client's IP address to third parties coupled to the Internet, or opportunity for malware to be received from such third parties by the client. The system S removes any such undesirable content in association with its processing and also the transcoding function. In one form, the transcoding is effected in accordance with the systems and methods disclosed in U.S. patent application Ser. No. 12/783,456 incorporated herein by reference.

Form Manager

Figure 5:
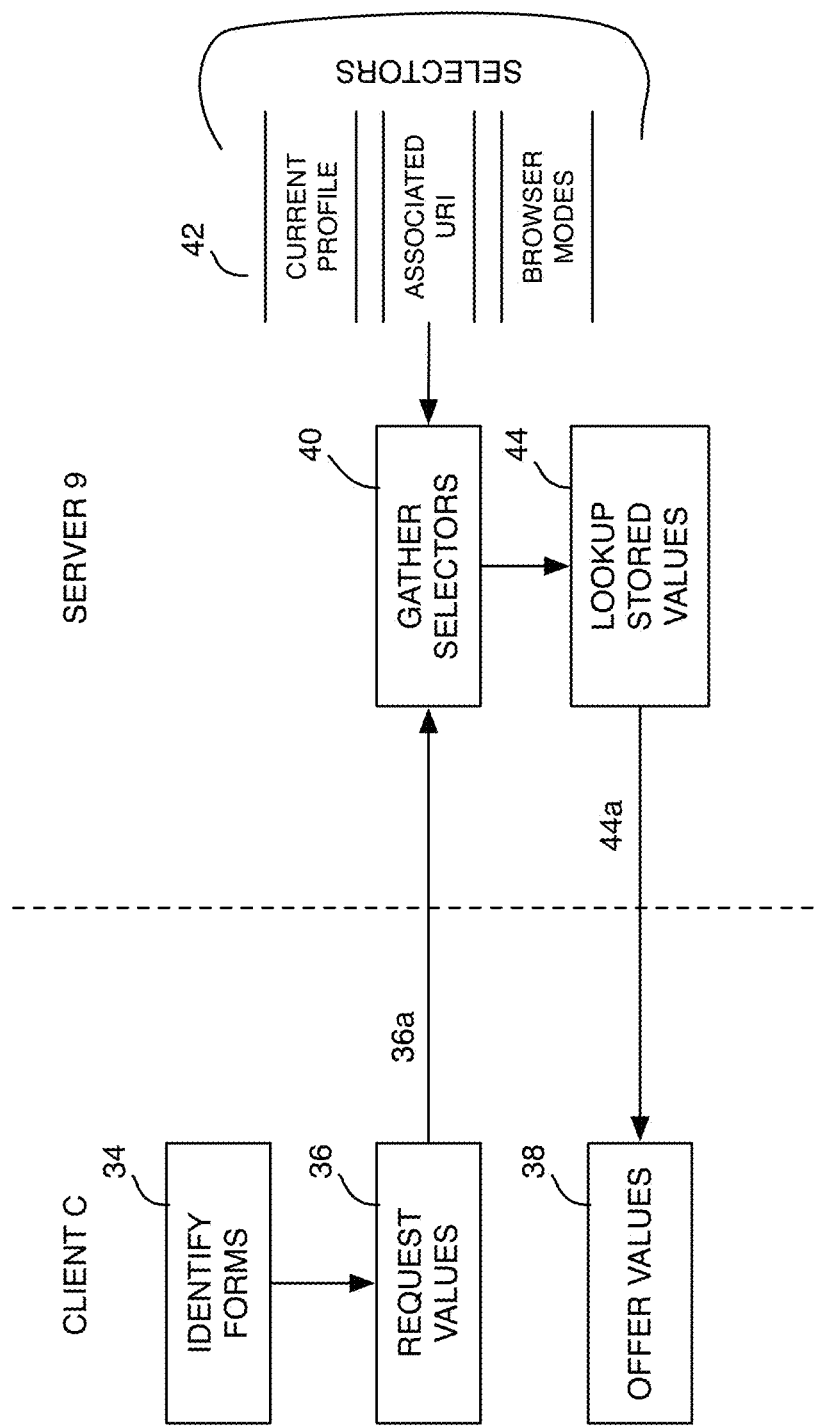
FIG. 5 is a flowchart showing use of stored meta-data in a network to aid in form filling, in accordance with the present system.

FIG. 5 depicts a flowchart overview of the storage and retrieval of meta-data in a network which is used to aid the user in the filling out of forms, such as login information. The Form Manager server enables a user to select an already-created identity (including an e-mail address) or to create an on-the-fly (OTF) new identity (including an e-mail address) on the spot, just for a website of a content provider. The Form Manager server recognizes the website as one where the user might have an account, and enables the user to log on by filling in the user's ID and password with a single click. Plus the Form Manager server enables a user to easily log in without requiring the user to remember credentials and without having to look them up somewhere.

Pursuant to the method of FIG. 5, while a user is viewing Internet content via his "browser" screen on the client resident on his computer, the Form Manager server 9 can be invoked by the client. To do so, the client identifies the presence of forms within that content (34). At that time, the client requests (36) the Form Manager server 9 to provide values for the forms (36a). The server 9 gathers parameters/selectors (40) specific to the end-user (42) and generates selection criteria among the values stored by the system S in the network. By way of example, the various parameters/selectors may be representative of the user's current profile, associated URI, and browser modes. The stored values are looked up (44) and returned to the client (44a). The client may then offer the retrieved values to the user as values to be inserted in the form (38). When a form is filled in and submitted back to the Internet content provider, the system S associates the filled in values with parameters specific to the user, parameters specific to the content provider, and stores the values and associations for future use, as just described.

Safe Payment

The system and method of the invention are operative for a user with a major name debit card that is only valid for transactions initiated by the user while utilizing the browser of system S. The account number associated with the debit card is useless for making purchases off-line. The card and its associated account number are also useless for making purchases online other than in conjunction with the transaction services provided by system S.

The debit card is linked to a bank account of the user to which the debit card transactions are applied. The user's bank account information is never exposed to merchants or fraudsters. The card is protected by a user-designated PIN which must be entered whenever the card is used to make a purchase online. This simple PIN function acts as a powerful tool for fraud protection, allowing the system S to "veto" purchases if proper credentials are not provided by the user. For someone to use the debit card fraud only, that person would need to know the users ID and password associated with his/her account at the server S (to gain access to the proxy browser provided by system S), and the user is PIN to successfully complete a purchase transaction.

The system S provides a method by which end-users may make purchases from merchants through debit card manager 4. The system S does not require a merchant to be an active participant, but it does require the merchant to have the ability to process credit card payments in the normal way, using the channels that exist prior to the present invention, and that are in universal use. In the system and method of the present invention, an user follows a signup process to connect a bank account owned by the user to a debit card number associated with a major financial credit company, such as MasterCard, or VISA. The user may utilize this card for transactions wherever the credit company's cards are accepted. Before the user performs a transaction, the transaction server of system S is informed of the transaction and the details of the transaction. The merchant follows the usual channels to charge the card holder's account, including address verification (AV2), authorization checks, and balance checks. The credit card issuer is a part of the transaction path, and upon receiving the transaction request from the merchant, contacts the transaction server of system S for authorization and verification. Once the transaction server has verified the transaction, the credit card issuer follows the normal path for the transaction, and settlement is made. The credit card issuer may deny the transaction for any reason, but may not allow the transaction if the transaction server of system S denies it.

Figure 6:
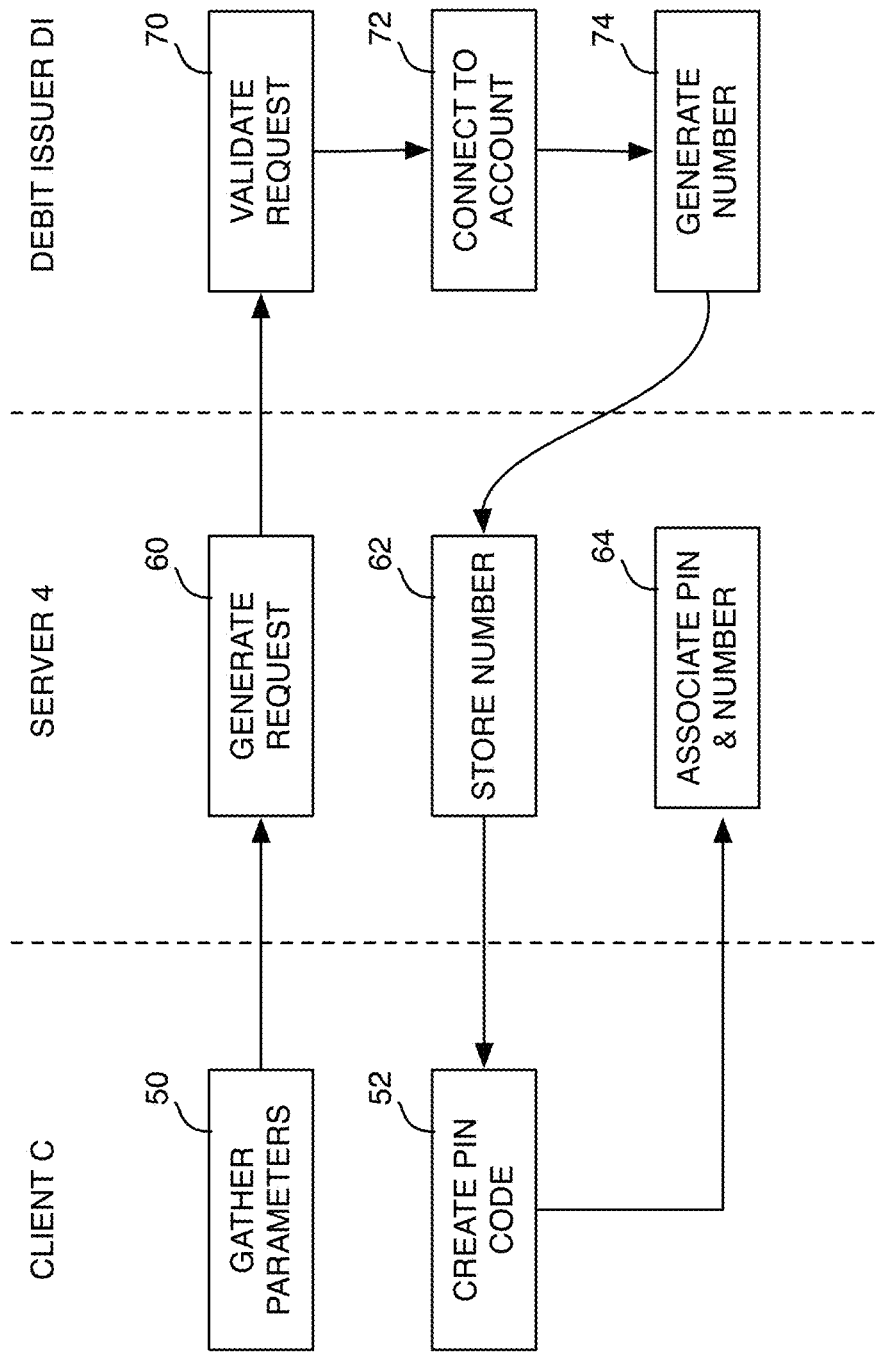
FIG. 6 is a flowchart showing client-aided registration and generation of card number in accordance with the present system.

FIG. 6 depicts the process flow of the user signing up for the debit card management service to be provided by way of system S, utilizing debit card manager server 4.

In one embodiment of the invention, the client on a user's computer, is utilized to gather the parameters required for the process from the user (50). The parameters are used by the server 4 to generate a request (60) for a card number from the issuer. The debit card issuer (DI) validates the request (70), which may include connecting a bank account of the end-user to the issuer's system (72). A new card number is generated, and returned (74) to the server 4. The server 4 stores the card number, associating it with the end-user of the system (62), and then informs the client. The client asks (52) the user to provide a Personal Identification Number (PIN), and requests that the server associates (64) the PIN with the card number.

The card number may be a one-time-only number, authorize for use on a single transaction. Alternatively, the card number may be established with a maximum value limit and/or use only during specific time intervals. These parameters are stored by server 4, and used pursuant to subsequent transactions initiated by the user.

Figure 7:
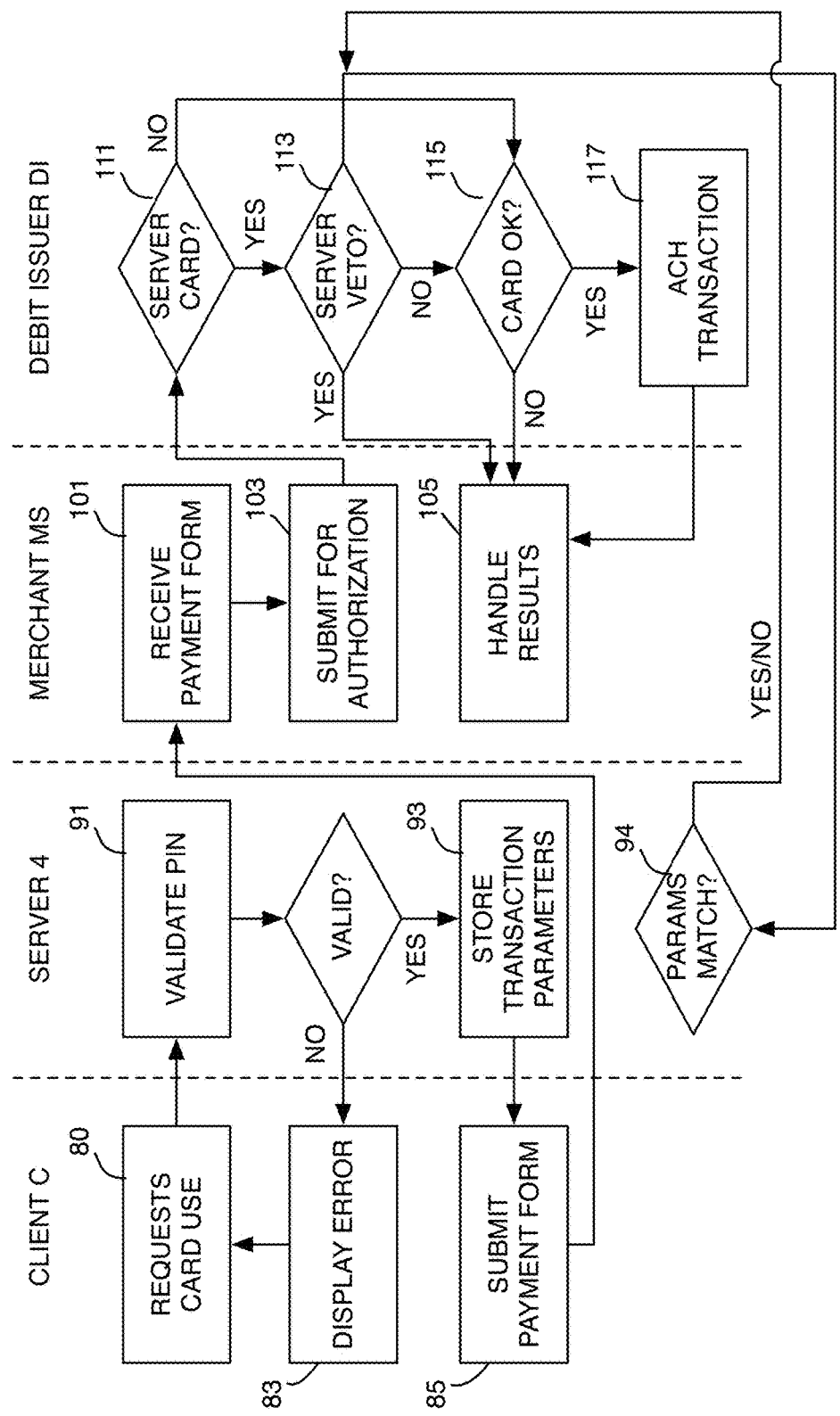
FIG. 7 is a flowchart of a financial transaction using the present system.

FIG. 7 illustrates a flowchart for the use of a debit card generated by a user as above, to make a purchase. The flowchart shows a preferred embodiment, where a software client on the user's computer is utilized to aid in the process of the transaction.

As shown in FIG. 7, a user initially uses the client to inform the server 4 of a future transaction (80). Information sent to the server 4 consists of the user's PIN code and transaction details. The server 4 validates the PIN code (91), and, if valid, stores the transaction parameters (93). If the information from the user is not valid, the server 4 so advises the client which in turn displays an error (83). The information may be deemed "not valid" for any of multiple reasons, including, but not limited to, incorrect PIN, value beyond authorized limit, transaction not in authorized time window.

The user utilizes the client to submit the merchant's online payment form (85) by way of server 4. This submission is preferably anonymous, as it is sent by server 4 using a proxy source address. Once the merchant server MS has received the payment form content (101), the transaction is submitted for authorization (103) to the debit card issuer DI (payment gateways notwithstanding) in the merchant's normal manner for a transaction.

The debit card issuer DI determines (111) whether the card number is associated with server 4 of the system S. If it is, the issuer DI contacts the server 4 (113) to see if the transaction should be allowed. The server generates a response to the query (94), and if the response would allow the transaction, the issuer DI follows the normal merchant/issuer process (115, 103), culminating in an ACH transaction (117) on the user's associated bank account. The result of performing the transaction is returned to the merchant, who completes the transaction in the normal way.

In a preferred embodiment, the communication between the debit card issuer DI and the server 4 is relatively fast, on the order of 30 ms.

In one embodiment of the system, the end-user uses the card to make live purchases, not on the Internet, by utilizing a mobile device to inform the server of the transaction before the purchase.

Notifications

The system and method of the invention are operative to provide a user with the ability to create, manage, and utilize ad-hoc, i.e., on-the-fly or ITF, e-mail notification addresses. These addresses can be configured to forward messages to another address of the user's choosing, to expire at a specific date, or to expire after a certain number of notifications have been received. The receive notifications can be stored for a time within the system S or can be forwarded away from the system S and stored elsewhere. The notification addresses created within the system S solves the problem of proliferating and disseminating personal email addresses, which leads to the undesired target marketing, phishing attempts and spam. If a notification address starts to get abused with spam, for example, the user simply deletes the address, resulting in no further spam and no further phishing to that address. The user can then create a new address to use.

In the prior art, there is no easy way for the average person to avoid providing a personal e-mail address when registering for services or making purchases online. For savvy individuals, such persons can have many e-mail addresses, each for a specific purpose, or they may have their own registered domain with multiple associated e-mail addresses for use as needed. Such options are not feasible for the average user, as they require a tremendous amount of forethought and understanding of the web. Even for sophisticated users, managing a multitude of e-mail accounts can be inconvenient at best, and a major problem at worst. The system S, through the notification manager server 2 provides an improved solution to the prior art methods noted above.

Figure 8:
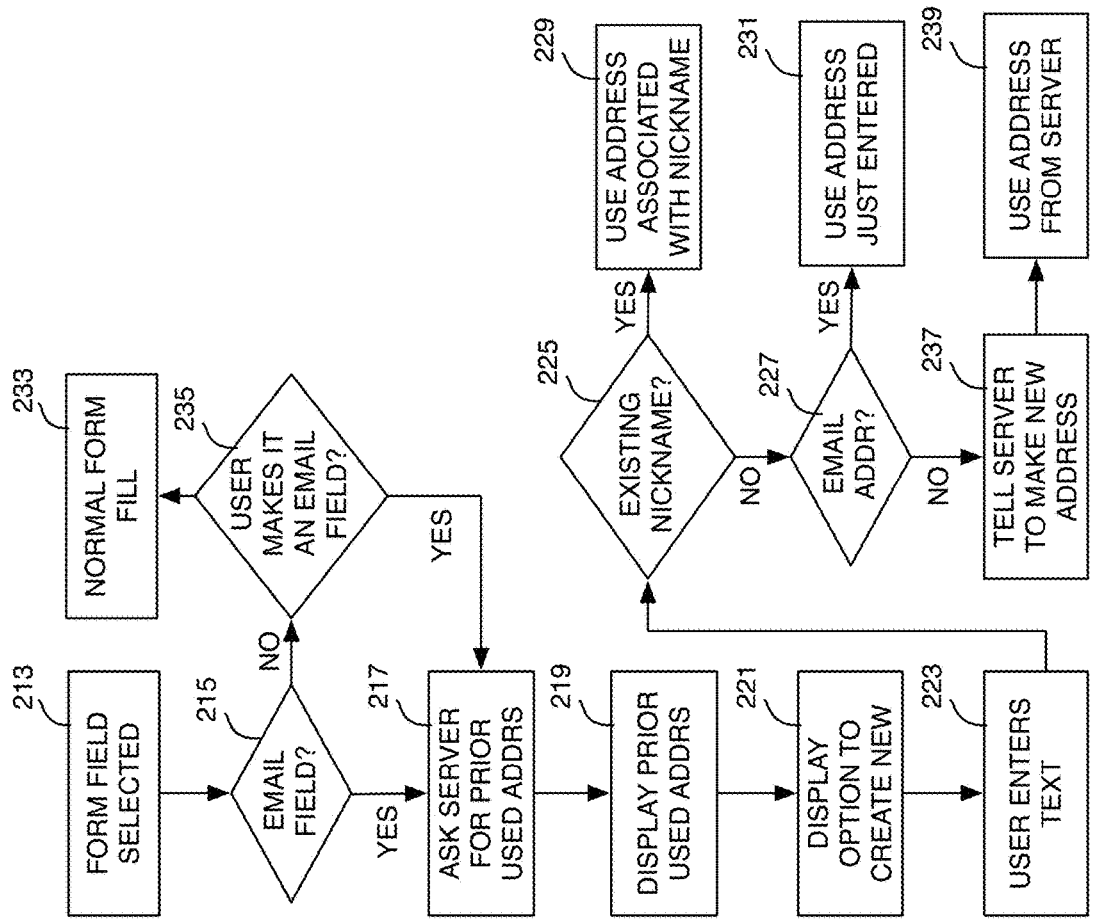
FIG. 8 is a flowchart of ad-hoc generation of e-mail addresses using the present system.

FIG. 8 is a flowchart depicting the process flow of a user setting up ad-hoc e-mail notification addresses by way of system S, utilizing notifications manager server 2.

In operation, for determination by a user of an e-mail address to be used with an email communication to a domain (for example, a particular merchant), a client on the user's computer presents to the user, a field in a document (213). When the user clicks in that presented field, If the client can determine automatically that the field should be treated as an e-mail address (215), or, if the user specifies that is should be treated as an e-mail address (235), then the server is queried by the client for any addresses belonging to the user that are associated with the domain (217) (for example, those previously associated by the user with the merchant identified by the domain). The addresses provided by the server are displayed to the user, using nicknames when possible (219). A user option is displayed by the client that allows the user to create a new ad-hoc e-mail address (221) in lieu of using one of the previously associated addresses. If the user elects to create a new address then as he/she enters text representative of the new address, the client continuously determines whether the user-entered text could be an existing alias address, a user's previously-supplied e-mail address, or an existing e-mail address (225, 227). If the user-entered text is a nickname for an existing address (225), then the client arranges to utilize the associated existing address when the form is submitted (229). If the user-entered text is in the format of an existing e-mail address (227), then the client arranges to utilize that existing address when the form is submitted (231). If the entered text is neither an existing nickname nor an existing e-mail address, then the client communicates with the server and requests a new ad-hoc e-mail address to be associated with the current user and the domain of the current page (237). The returned address is then used to fill in the form (239.

Exemplary code to effect server-side address generation is:

--- class NotificationAddress < ActiveRecord::Base
belongs_to :end_user
has_many :notifications, :dependent => :delete_all
before_save :force_valid_state
 # If your website is qa.vworldc.com, change this to "qa-" and edit the database definition in -continued

```
# script/receive_notification.
EXTRASTUFF = ""
# The various states of a notification address.
ACTIVE        = 1
INACTIVE      = 2
DELETED       = 3
def to_label
nickname or identifier
end
def self.get_nickname(incoming_email_string)
    self.find_by_identifier(incoming_email_string.gsub(/@.*$/, "")).nick-
name
rescue nil
end
def self.build(options={ })
result = self.new
result.identifier = self.make_identifier
result.rx_count = 0
result.state = ACTIVE
result.do_update(options)
result
end
def normalize_domain
self.domain = self.associated_uri
self.domain | |= ""
self.domain.downcase!
self.domain.sub!(/^http[s]*: \ / \ //, "")
self.domain.sub!(/ \ /.*$/, "")
self.domain.sub!(/(^.+\.)(.+\.)(.*$)/, '\2\3')
end
def force_valid_state
self.state = INACTIVE if not self.state
self.identifier | |= NotificationAddress.make_identifier
self.identifier = self.identifier.downcase
self.expires at = DateTime.parse(self.expires at) if self.expires at.class
String
self.normalize_domain
end
def self.random_string(length=16)
rs = [File.open("/dev/urandom").read(length)].pack("m").chomp.chomp
("= =")
rescue nil
if !rs
alphabet = "123456789abcdefghijk1mnopgrstuvwxyz_."
alphabet_size = alphabet.length
rs = ""
length.times { rs << alphabet[rand(alphabet size)] }
end
rs
end
def self.make_identifier
seed id = Digest::SHA1.hexdigest("--# {Time.now.to_s} --
# {self.random string(16)}--")
# Some sites barf if the e-mail address is longer than 16 characters.
    real_id = EXTRASTUFF + seed_id[0..8] + seed_id[33..40]
end
def do_update(options= { })
self.nickname = options[:nickname] if options.has_key?(:nickname)
self.associated_uri = options[:associated_uri] if
options.has_key?(:associated uri)
self.associated_uri | |= options[:uri] if options.has_key?(:uri)
self.forwarding_address = options[: forwarding_address] if
options.has_key?(:forwarding_address)
    self.expires at = options[:expires_at] if options.has_key?(:expires_at)
self.max uses = options[:max_uses] if options.has_key?(:max_uses)
if options.has_key?(:state)
    self.state      ACTIVE if options[:state] = = "ACTIVE" | |
options[:state] ACTIVE
    self.state      INACTIVE if options[:state] = =
"INACTIVE" | | options[:state] == INACTIVE
self.state         DELETED if options[:state] = = "DELETED" | |
options[:state]
= = DELETED
end
self
end
end
```

Figure 9:
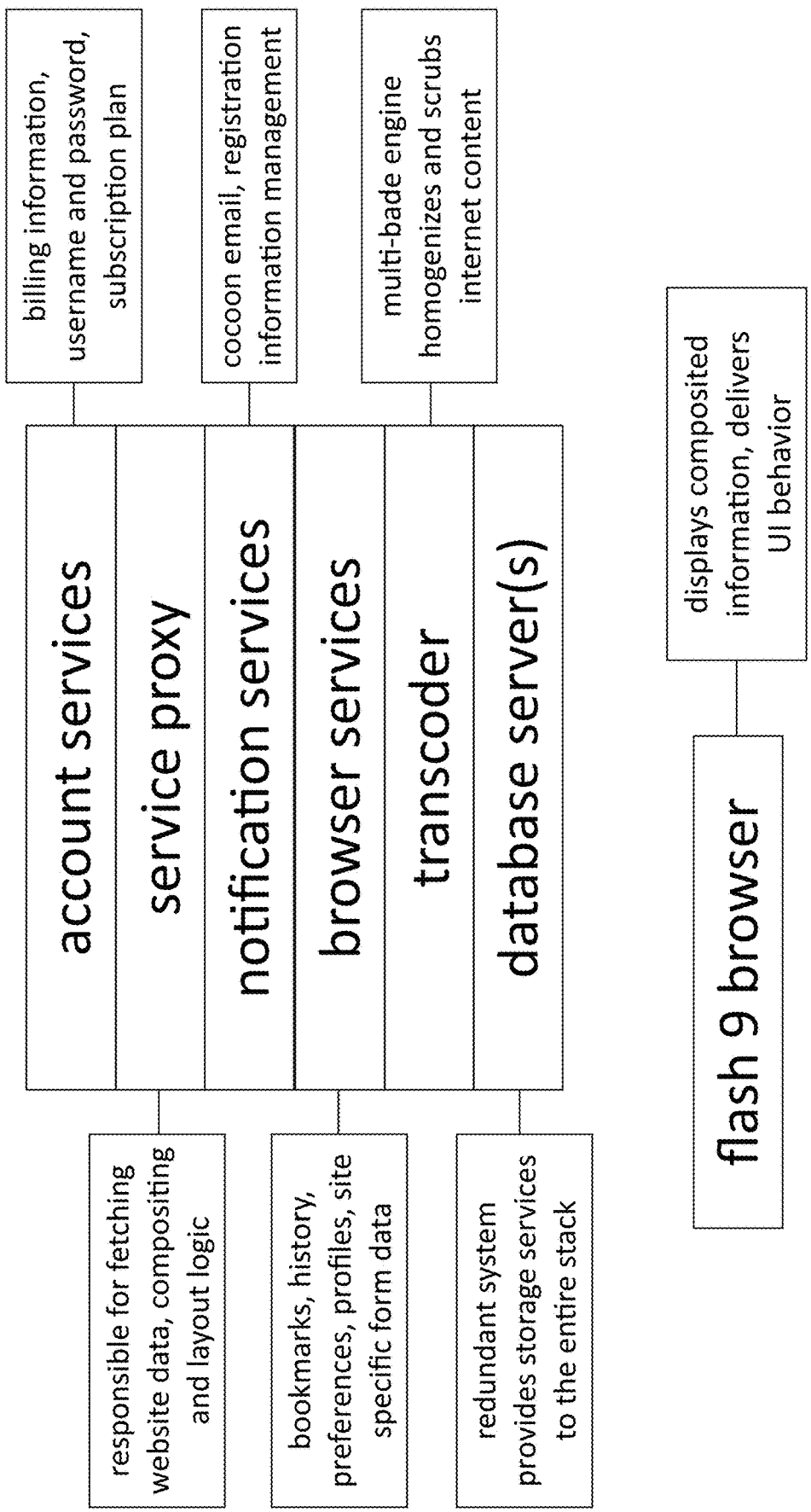
FIG. 9 shows the service stack for the present system.

A table showing the service stack for the system S is shown in FIG. 9. That table shows the hierarchical elements of the stack: account services, service proxy, notification services, browser services, transcoder and database server(s), with a Flash 9 browser. Short descriptors are associated with each element of the stack.

EXAMPLES

The following illustrates a user interaction with a client which has been loaded to his computer by system S.

Figure 10:
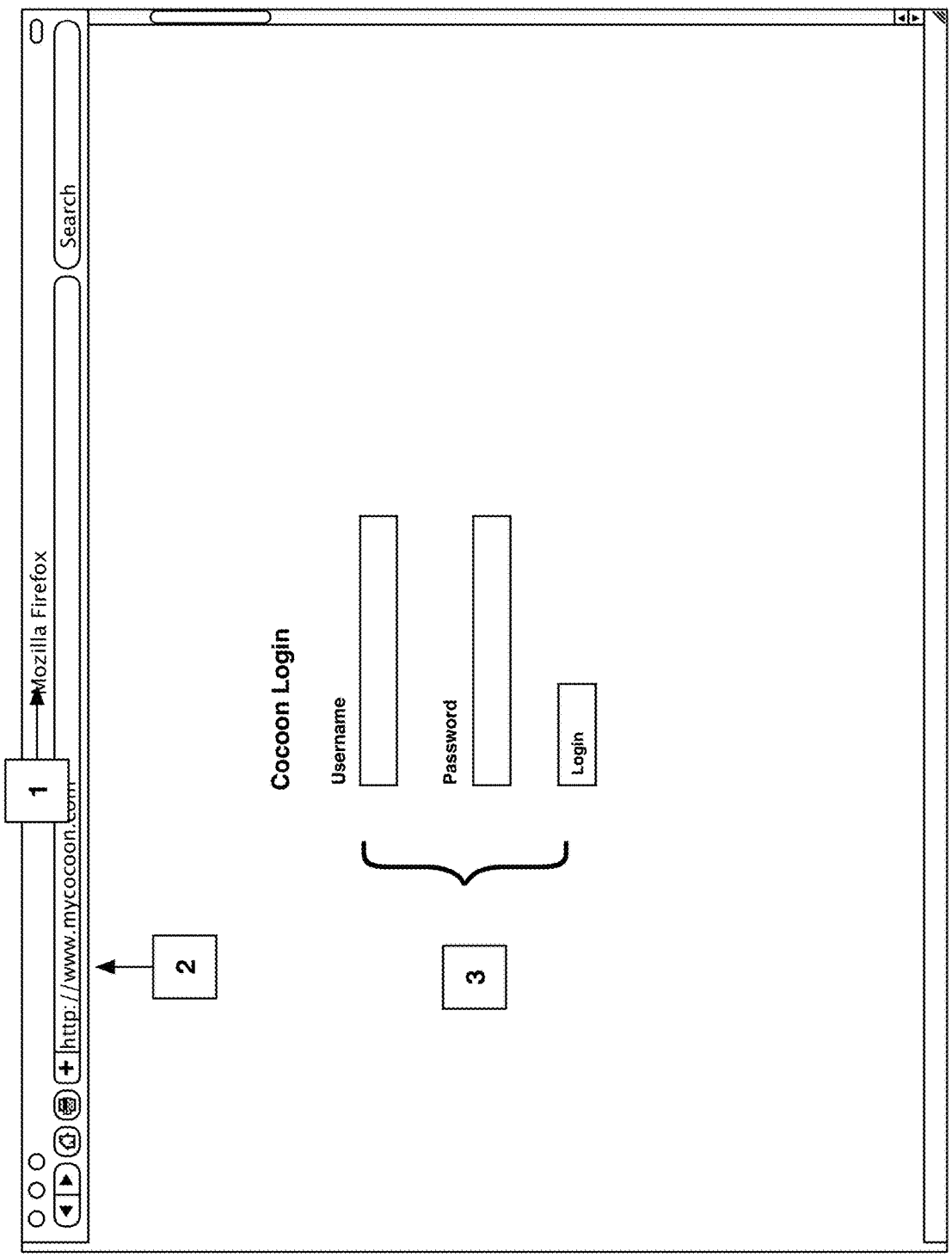
FIGS. 10-12 show exemplary web screens when browsing with the present invention.

The following sequence of numbered steps are illustrated in FIGS. 10-13:

Safe and Private Browsing:

1. The user opens a conventional browser, for example, Firefox, Internet Explorer, Safari. (FIG. 10)

2. The user then goes to the website for the system S, in this case by entering www.mycocoon.com. (FIG. 10)

3. The user logs in with his user name and password. (FIG. 10)

Figure 11:
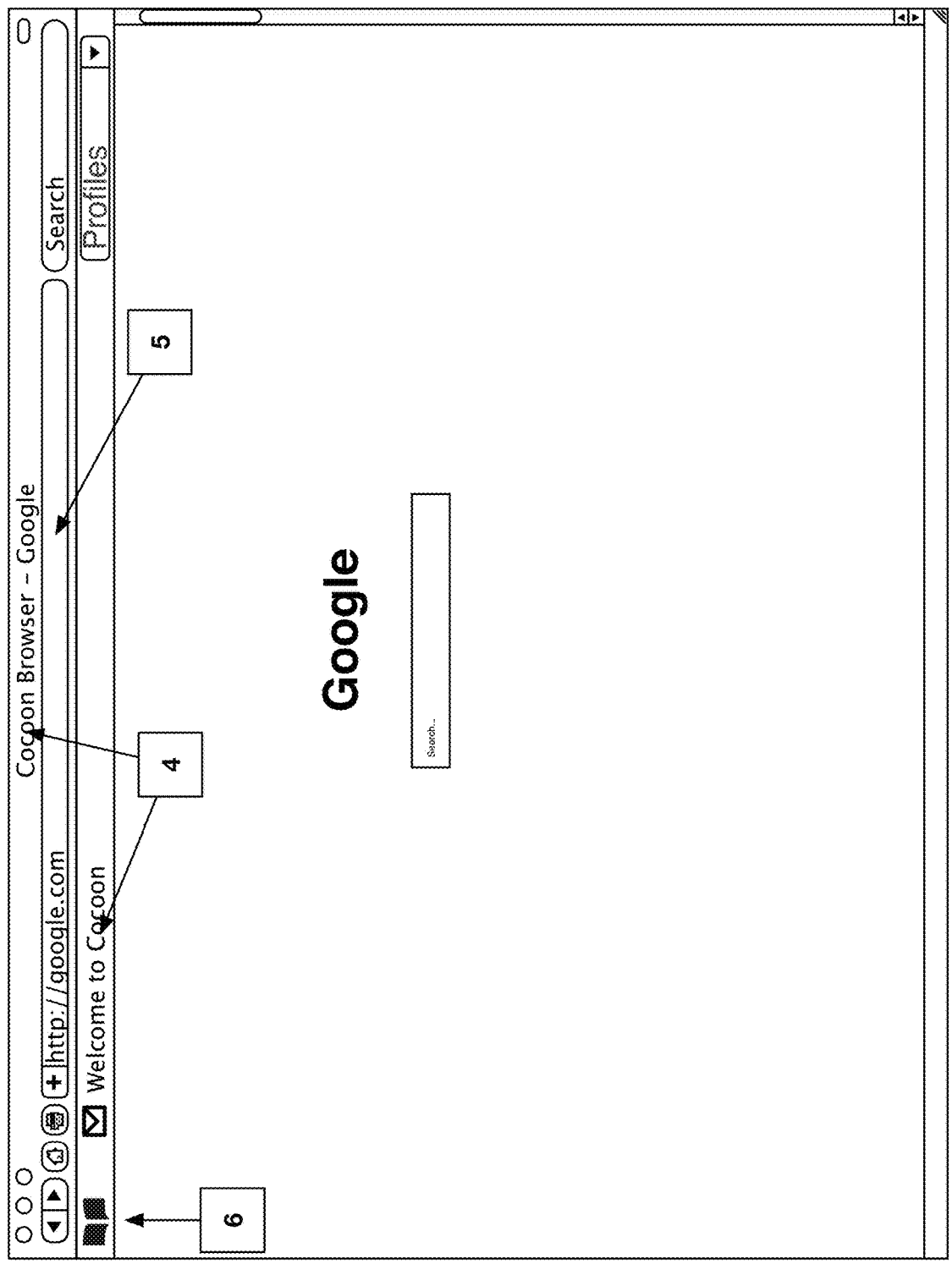

4. Once logged in, the cocoon browser is dynamically loaded to the user's computer's memory—so it appears as just another application running on that computer. (FIG. 11)

5. The user can set his/her home page on the cocoon browser to his/her favorite website, for example Google.com. The user can serve as usual like typing a web address in the URL box of the displayed cocoon browser screen. (FIG. 11)

6. The user can select a bookmark to visit a previously bookmarked website. (FIG. 11)

Figure 12:
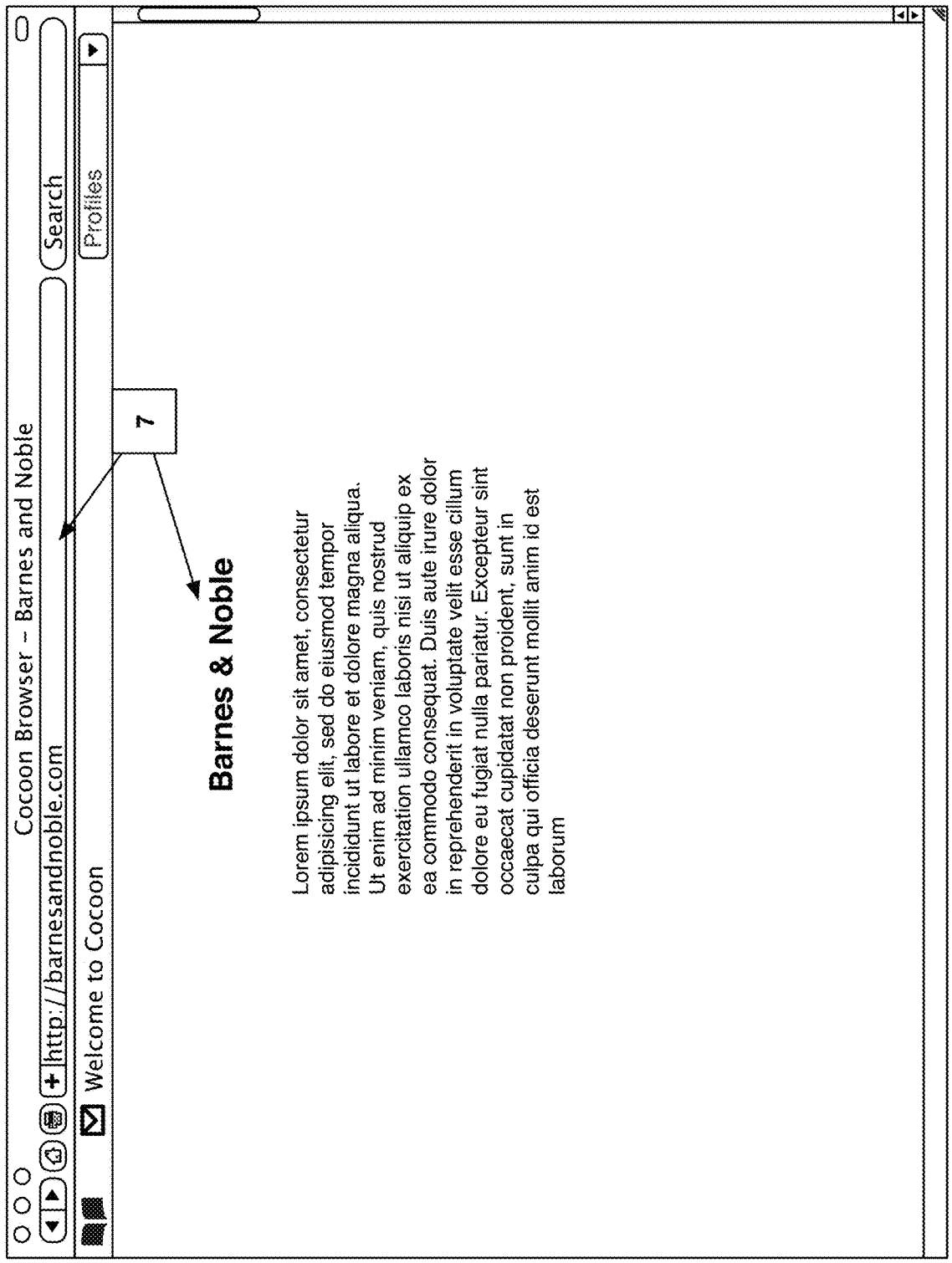

7. For example, the user can go to www.BarnesandNoble.com. (FIG. 12)

8. The user's computer and his/her privacy are protected. No information is visible regarding the IP address and computer. In FIG. 13, a table is set forth which shows what websites know about the user's location and his/her computer. In the example of FIG. 13, a user from Gloucester Mass. (see column 2 of FIG. 13) would reveal his/her IP address, his/her location and other information about his/her computer, which could be used for tracking, target marketing, and exposing vulnerabilities in his computer software which could be exploited by malware. When the user is using the system and method of the invention, websites have access to cocoon service information only (see column 3 of FIG. 13), which yields his/her IP address and protects his/her privacy and security. (FIG. 13)

The following sequence of numbered steps are illustrated in FIG. 14-18:

Form Manager and Notifications:

9. On any web form, the cocoon service assists the user to fill the form easily while protecting his/her personal e-mail address. (FIG. 14)

10. The user selects the profile he/she wants to use or create a new profile. (FIG. 14)

11. In the example of FIG. 14, there are two profiles set up (Home and Work). The user (Kevin in this case), clicks the Home profile. (FIG. 15)

12. Information for Kevin is automatically entered into the form. (FIG. 15)

13. The Home profile includes the personal e-mail address for Kevin, but the user has indicated that he does not want to give that address to the selected website. (FIG. 15)

Figure 16:
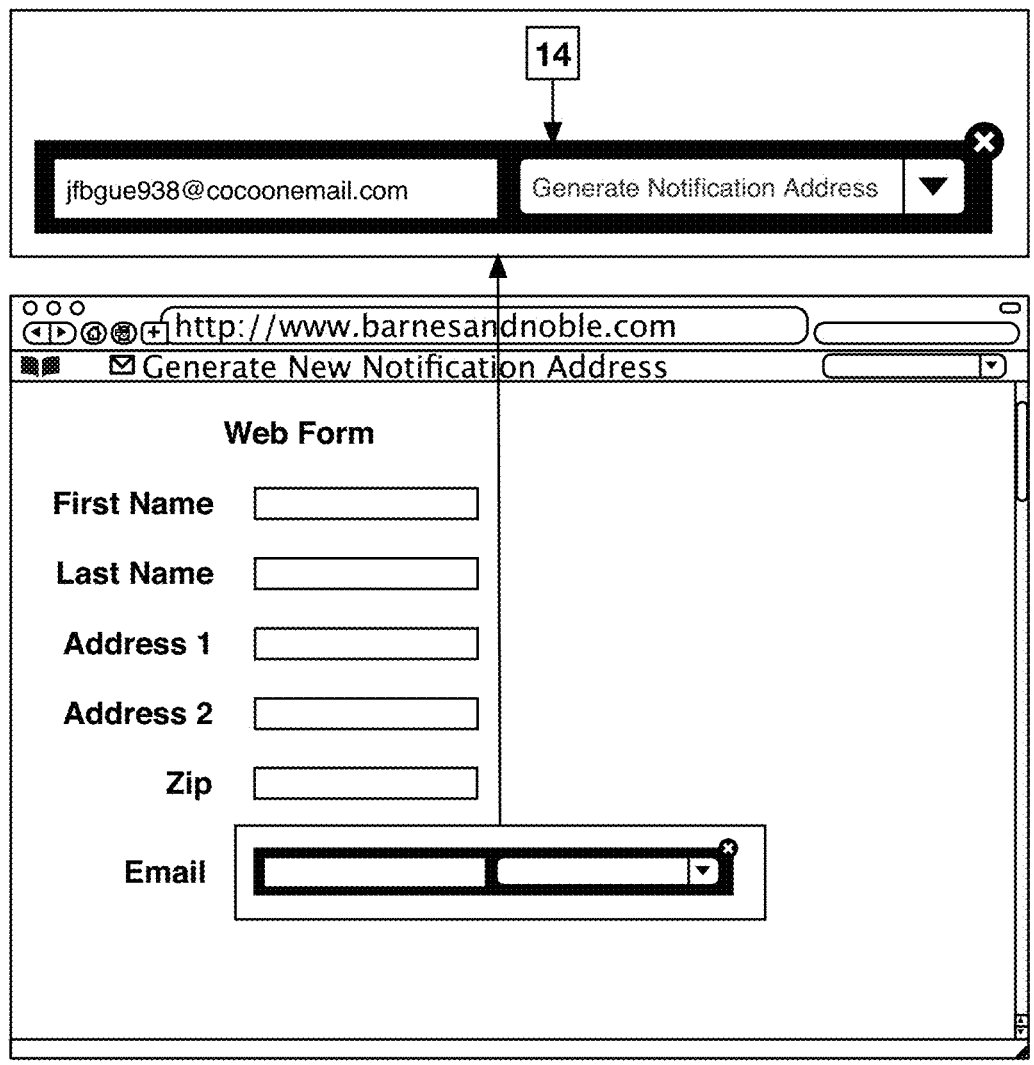

14. When the user clicks in the e-mail box on the form, the cocoon service displays a small Notifications window. The user can simply click the button to generate a unique Cocoon e-mail address for the site which he/she presently is on. (FIG. 16)

Figure 17:
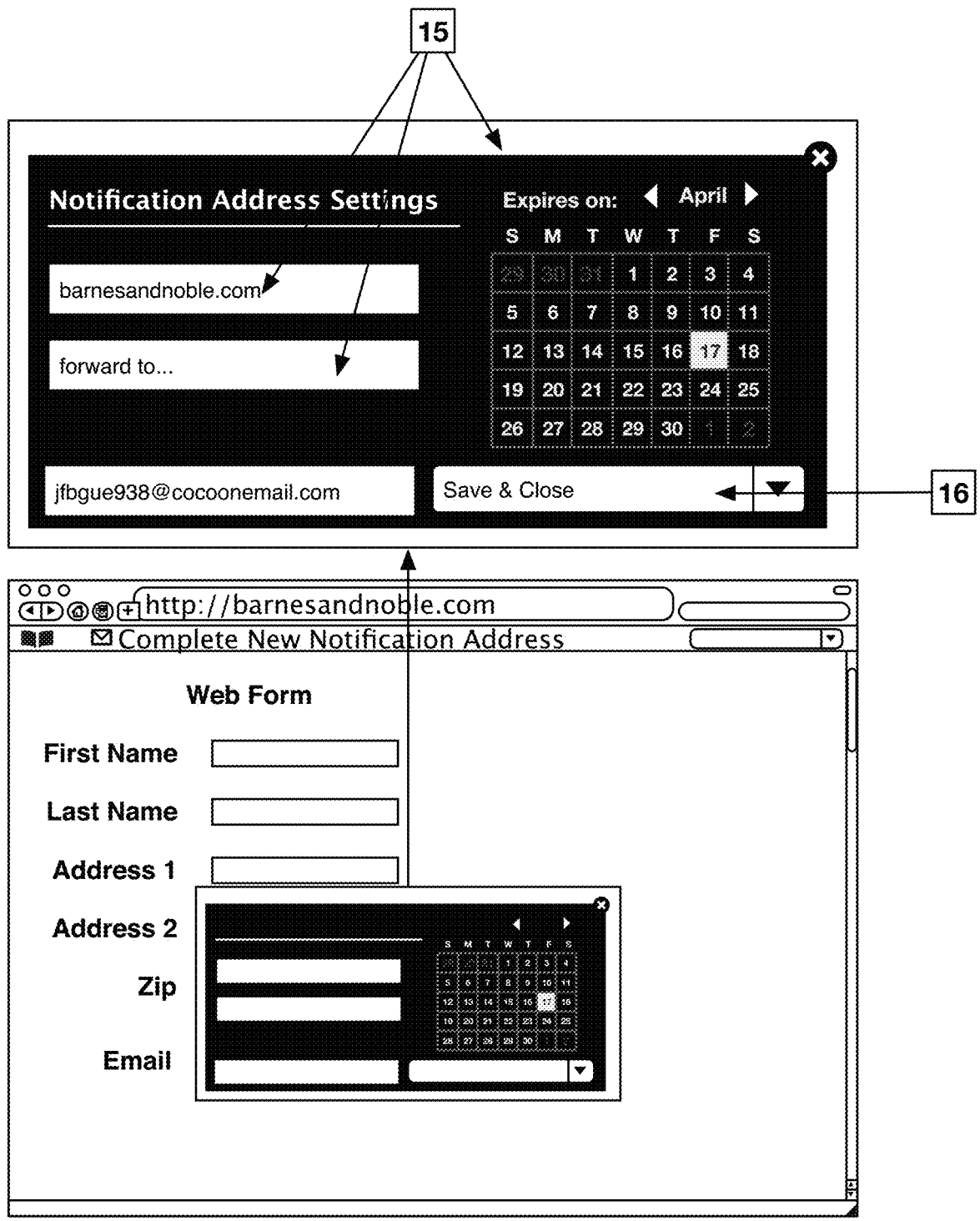

15. The user can specify a name, an expiration date, any forwarding e-mail address. (FIG. 17)

16. When the user clicks "Save & Close", the user's Cocoon account will remember the email address and the remainder of the profile information used on this site. That information will be available to the user at the click of a button whenever he/she returns to the site and wants to login. (FIG. 17)

Figure 18:
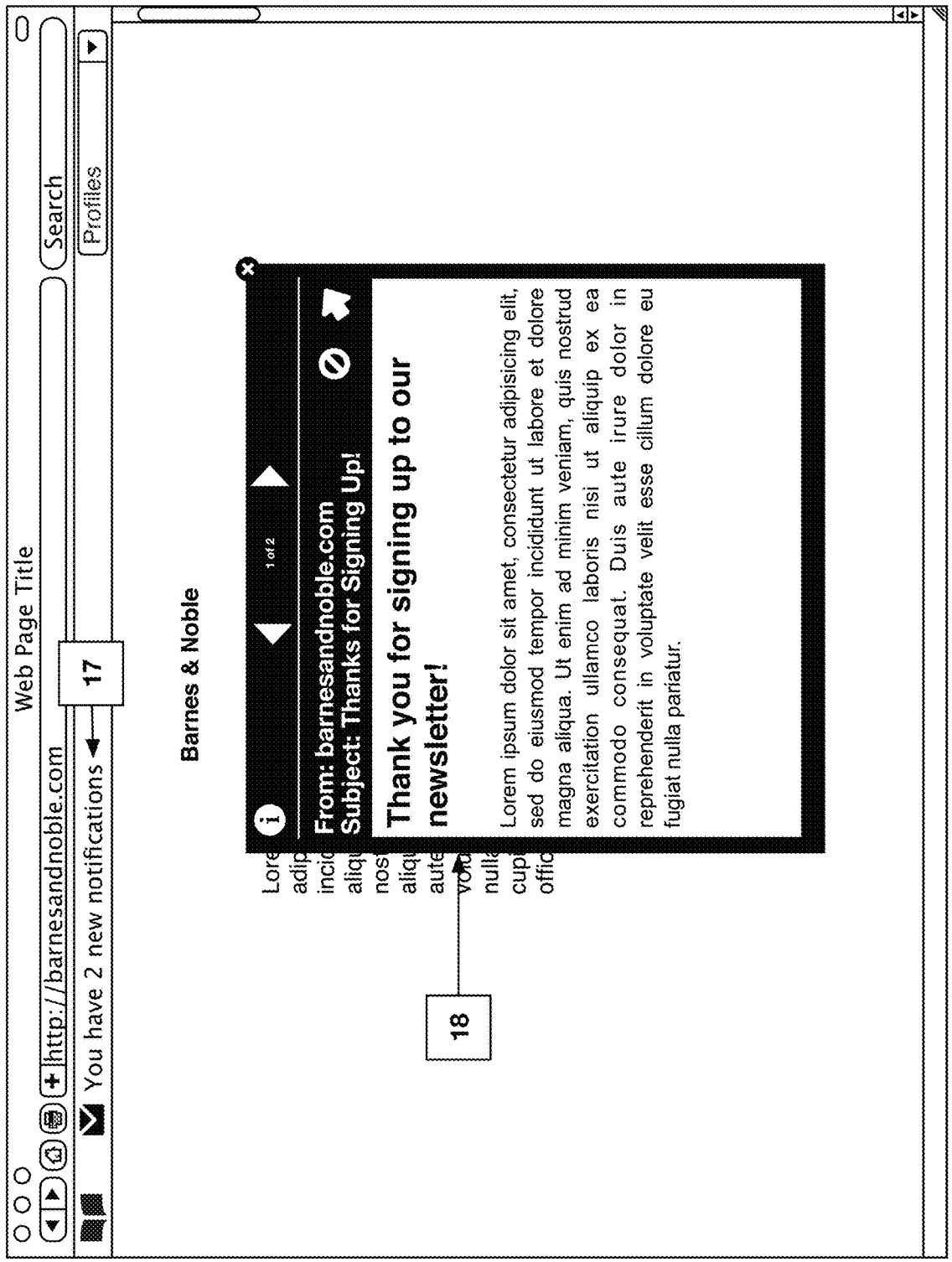

17. When the user receives e-mail from this website, he/she will see that information displayed in the Cocoon browser status area. The user can click the Notification button to view messages. (FIG. 18)

18. Messages appear in an overlay window on the Cocoon browser screen. (FIG. 18)

Figure 19:
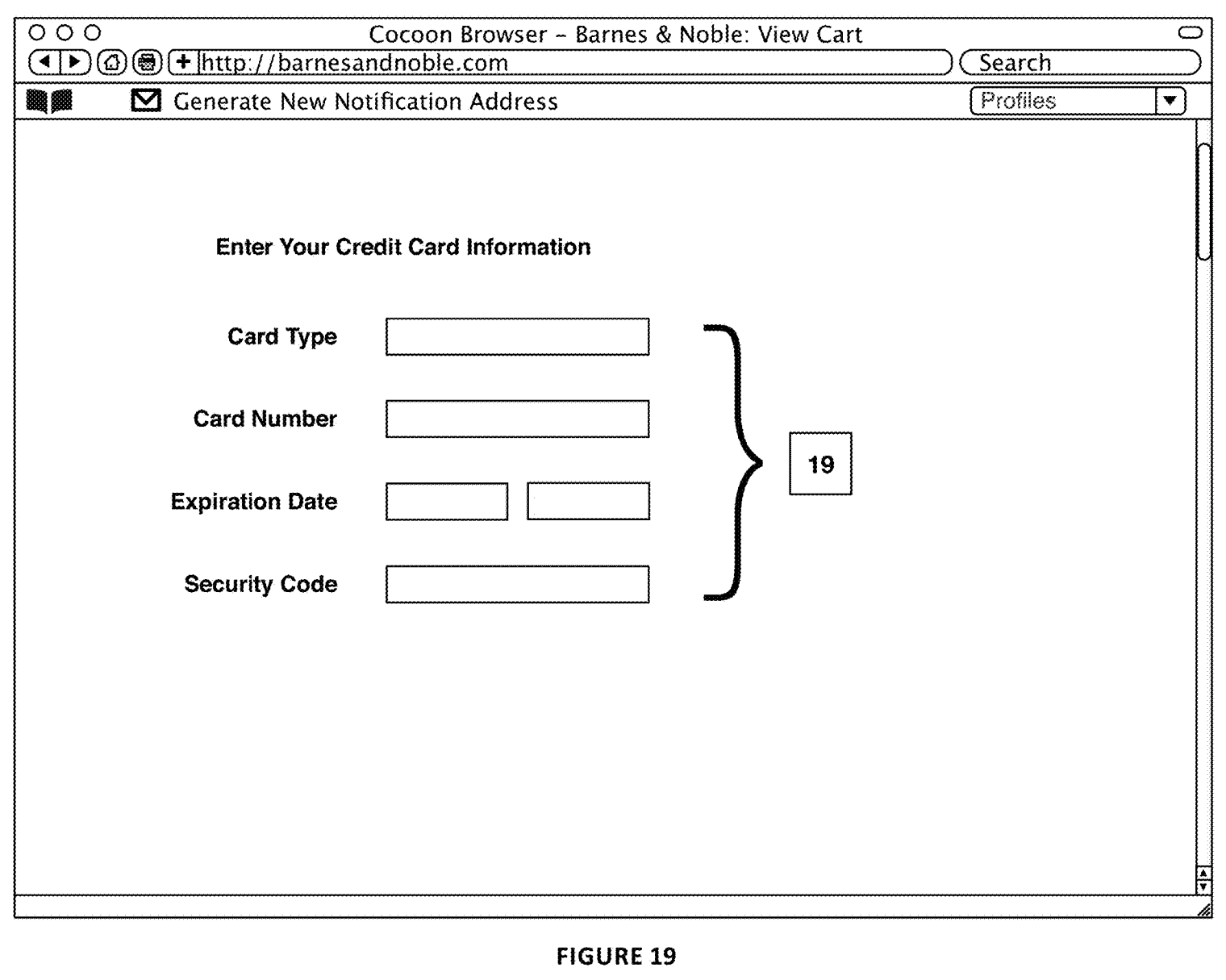

The following sequence of numbered steps are illustrated in FIGS. 19-22 Debit card:

19. When the user makes a purchase online, the Cocoon service makes it easy and protects his/her financial information. The Cocoon browser recognizes credit card forms automatically. (FIG. 19)

Figure 20:
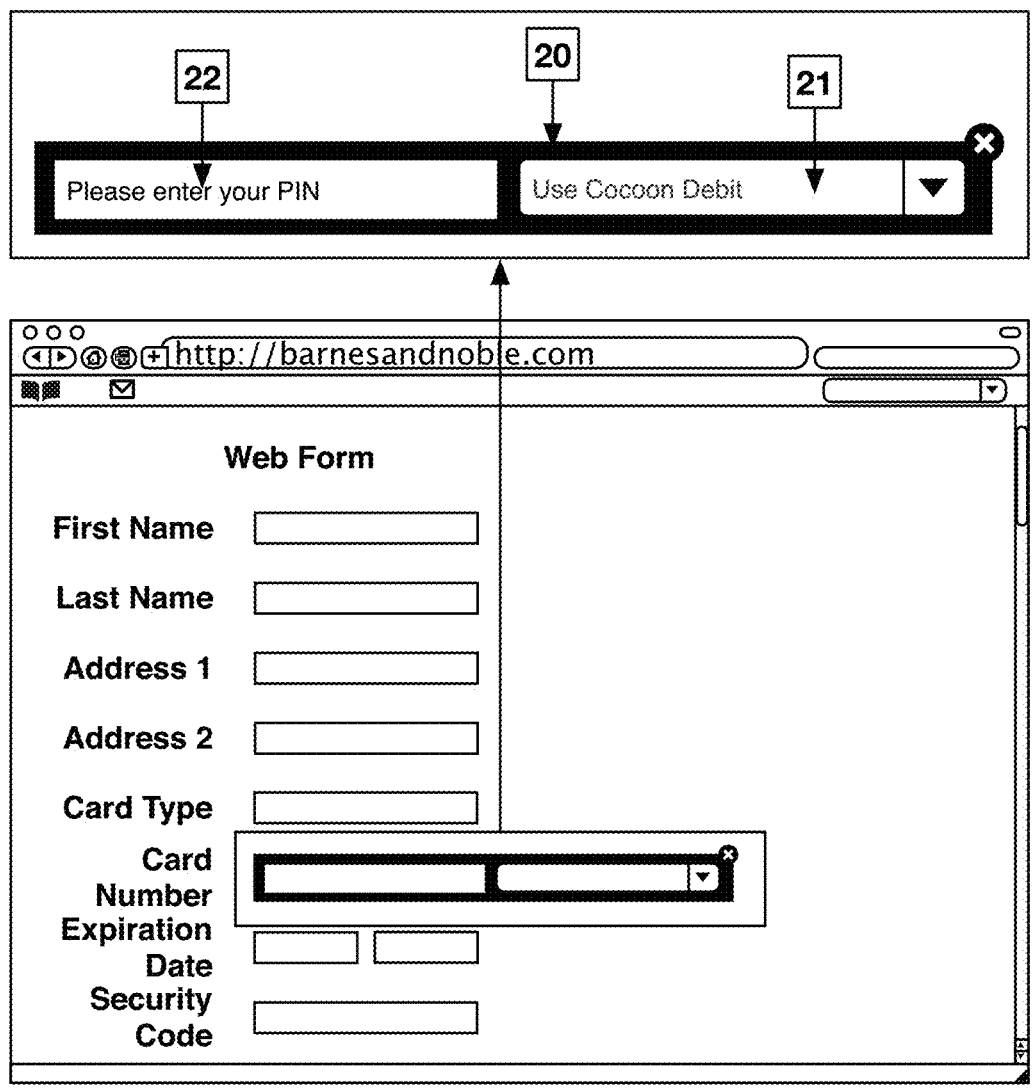

20. When the user clicks in the box for the credit card number on the form, the Cocoon system displays a small Debit window. (FIG. 20)

21. The user clicks the button to use his/her secure Cocooned Debit Card. (FIG. 20)

22. The Cocoon Debit Card requires the user to enter his/her PIN. (The user can close the Debit window and enter a credit card number correctly if he/she does not want to use his/her Cocoon Debit Card). (FIG. 20)

Figure 21:
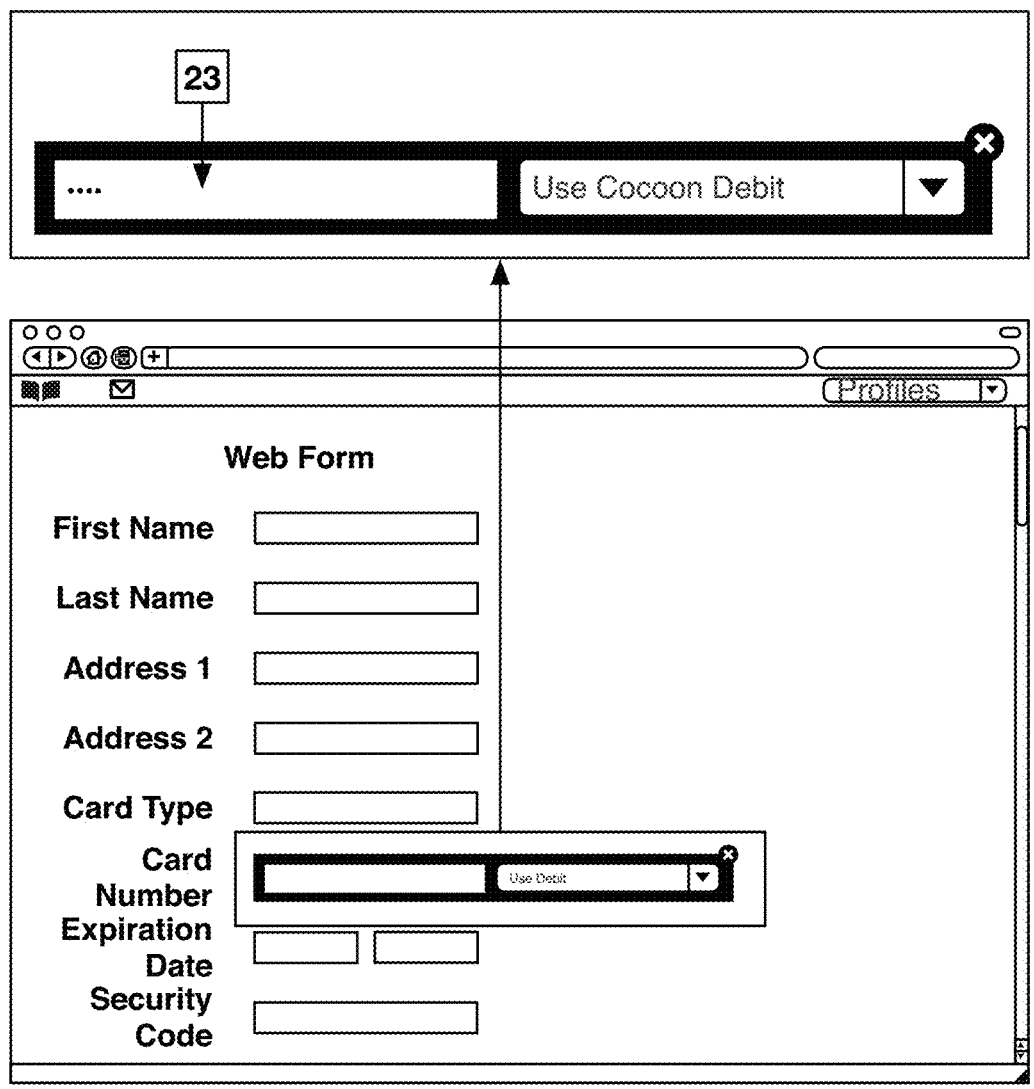

23. The user enters his/her PIN to proceed with a safe payment. (FIG. 21)

Figure 22:
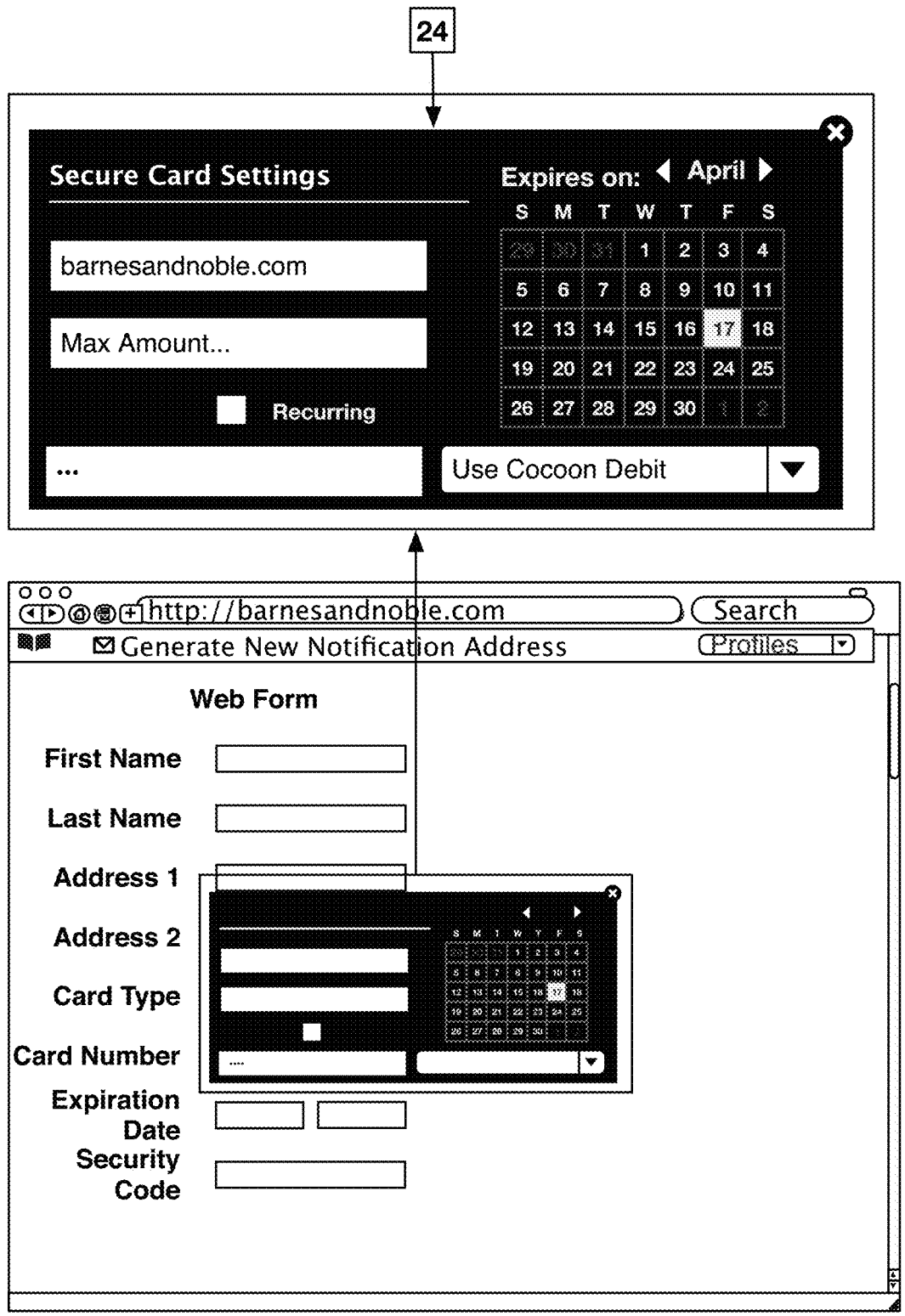

24. The user can enter additional information for this payment and this website if he/she desires, such as the website name, the maximum allowed for purchases on this site, expiration date for payments to this site, and recurring payments to this website. (FIG. 22)

The various methods described above may be embodied in, and fully automated by, software code modules executed by one or more general purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data.

As will be appreciated, various combinations of the features and methods described herein may be incorporated into a given system according to the invention. Accordingly, all combinations of the disclosed features and methods fall within the scope of this disclosure.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

The invention claimed is:

1. A system for coupling one or more user computers to the Internet, comprising:
   a proxy server adapted to enable bidirectional communications between one of said user computers and a party coupled to the Internet, wherein the one of said user computers is characterized by a user identifier, whereby the identity of said user computer is not made known to said party,
   wherein the proxy server includes an internet access server on a computer network, wherein the internet access server includes a processor with an internet browser associated therewith, residing on and running on the internet access server,
   wherein the internet access server is adapted to:
      provide a web-based service to the user by way of a private launching point of a browser-like interface at the display of the user computer, and
      establish a secure internet communication link through the private launching point of a browser-like interface at the display of the user computer while isolating the user computer from internet-coupled parties other than the internet access server during existence of the secure internet communication link, whereby the identifier of the user computer is not provided to internet-coupled parties other than the internet access server.

2. A system according to claim 1, further comprising:
   one or more manager modules associated with said proxy server, each of said manager modules being adapted to provide a service to a user of said user computer.

3. A system according to claim 2 wherein said service is an automated form-filling service.

4. A system according to claim 2 wherein said service is a debit card transaction service.

5. A method for establishing a secure internet communication link between a user and a user-desired internet-coupled party by way of a user computer having a memory and a display, and characterized by a user identifier, comprising the steps of:
   by an internet access server on a computer network, wherein the internet access server includes a processor with an internet browser associated therewith, residing on and running on the internet access server,
      providing a web-based service to the user by way of a private launching point of a browser-like interface at the display of the user computer, and
      establishing a secure internet communication link through the private launching point of a browser-like interface at the display of the user computer while isolating the user computer from internet-coupled parties other than the internet access server during existence of the secure internet communication link, whereby the identifier of the user computer is not provided to internet-coupled parties other than the internet access server.

6. The method according to claim 5, comprising the sub-steps of:
   by the internet access server:
      connecting, by the processor, to the memory of the user computer and downloading a client to the memory, but not installing the client on the user computer, thereby generating the browser-like interface at the display of the user computer and establishing the private launching point for online activity by the browser-like interface by way of the internet browser running on the internet access server whereby the identifier of the user computer is not provided to internet-coupled parties,
      receiving, by the internet browser, over the Internet, a user-desired communication link request and an associated user message from the user by way of the private launching point of the internet browser-like interface of the client at the display of the user computer, wherein the user-desired communication link request includes information representative of the identifier of the user computer and the internet address of the desired internet-coupled party, and wherein the identifier of the user computer is not provided to internet-coupled parties other than the internet access server, associating a proxy identifier with the user, and sending, by the processor, in response to the received user-desired communication link request and the user message, a proxy link request over the Internet to the internet address of the user-desired internet-coupled party, wherein the proxy link request includes data representative of the proxy identifier of the user and the user message, and wherein the identifier of the user computer is not provided to internet-coupled parties other than the internet access server.

7. The method according to claim 6, comprising the further sub-steps of:

by the internet access server:

receiving, by the processor, from the user-desired internet-coupled party over the Internet, a reply indicative of receipt of the proxy link request and addressed to the proxy identifier of the user, and sending, by the processor, the reply over the internet, to the user computer by way of the client through the private launching point of the browser-like interface at the display of the user computer whereby the identifier of the user computer is not provided to internet-coupled parties, thereby establishing a secure bidirectional internet communication link between the user and the user-desired internet-coupled party wherein the identifier of the user computer is not provided to internet-coupled parties other than the internet access server.

8. The method according to claim 6, wherein the identifier of the user computer corresponds to an IP address for a computer.

9. The method according to claim 6, wherein the identifier of the user computer corresponds to an email address associated with a computer.

10. The method according to claim 6, wherein the identifier of the user computer corresponds a device identifier associated with a computer.

11. A system according to claim 1 wherein the internet access server is adapted to:

connect, by way of the processor, to the memory of the user computer and download a client to the memory, but not install the client on the user computer, thereby generating the browser-like interface at the display of the user computer and establishing the private launching point for online activity by the browser-like interface by way of the internet browser running on the internet access server whereby the identifier of the user computer is not provided to internet-coupled parties, receive, by the internet browser, over the Internet, a user-desired communication link request and an associated user message from the user by way of the private launching point of the internet browser-like interface of the client at the display of the user computer, wherein the user-desired communication link request includes information representative of the identifier of the user computer and the internet address of the desired internet-coupled party, and wherein the identifier of the user computer is not provided to internet-coupled parties other than the internet access server, associate a proxy identifier with the user, and send, by way of the processor, in response to the received user-desired communication link request and the user message, a proxy link request over the Internet to the internet address of the user-desired internet-coupled party, wherein the proxy link request includes data representative of the proxy identifier of the user and the user message, and wherein the identifier of the user computer is not provided to internet-coupled parties other than the internet access server.

12. A system according to claim 11 wherein the internet access server is further adapted to:

receive, by way of the processor, from the user-desired internet-coupled party over the Internet, a reply indicative of receipt of the proxy link request and addressed to the proxy identifier of the user, and send, by way of the processor, the reply over the internet, to the user computer by way of the client through the private launching point of the browser-like interface at the display of the user computer whereby the identifier of the user computer is not provided to internet-coupled parties, thereby establishing a secure bidirectional internet communication link between the user and the user-desired internet-coupled party wherein the identifier of the user computer is not provided to internet-coupled parties other than the internet access server.

13. A system according to claim 11, wherein the identifier of the user computer corresponds to an IP address for a computer.

14. A system according to claim 11, wherein the identifier of the user computer corresponds to an email address associated with a computer.

15. A system according to claim 11, wherein the identifier of the user computer corresponds a device identifier associated with a computer.

16. A system according to claim 2 wherein said service is an anonymizing notification service.

* * * * *